United States Patent
Masputra et al.

(10) Patent No.: US 11,095,758 B2
(45) Date of Patent: Aug. 17, 2021

(54) METHODS AND APPARATUS FOR VIRTUALIZED HARDWARE OPTIMIZATIONS FOR USER SPACE NETWORKING

(71) Applicant: Apple Inc., Cupertino, CA (US)

(72) Inventors: Cahya Adiansyah Masputra, San Jose, CA (US); Darrin Jewell, Woodside, CA (US); Sandeep Nair, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/365,484

(22) Filed: Mar. 26, 2019

(65) Prior Publication Data

US 2019/0306282 A1    Oct. 3, 2019

Related U.S. Application Data

(60) Provisional application No. 62/649,509, filed on Mar. 28, 2018.

(51) Int. Cl.
*H04L 29/06* (2006.01)
*H04L 12/46* (2006.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC ....... H04L 67/34; H04L 69/162; H04L 69/16; H04L 47/2483; H04L 47/30; H04L 47/6275; H04L 69/163; H04L 69/164; H04L 69/161; H04L 69/22; H04L 69/18; H04L 69/02; H04L 12/4641; H04L 63/166; H04L 47/2475; H04L 47/6295;
(Continued)

(56) References Cited

U.S. PATENT DOCUMENTS

| | | |
|---|---|---|
| 5,367,688 A | 11/1994 | Croll |
| 7,100,020 B1 | 8/2006 | Brightman et al. |

(Continued)

*Primary Examiner* — Jungwon Chang
(74) *Attorney, Agent, or Firm* — Sterne, Kessler, Goldstein & Fox P.L.L.C.

(57) ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack).

20 Claims, 12 Drawing Sheets

Figure 1:
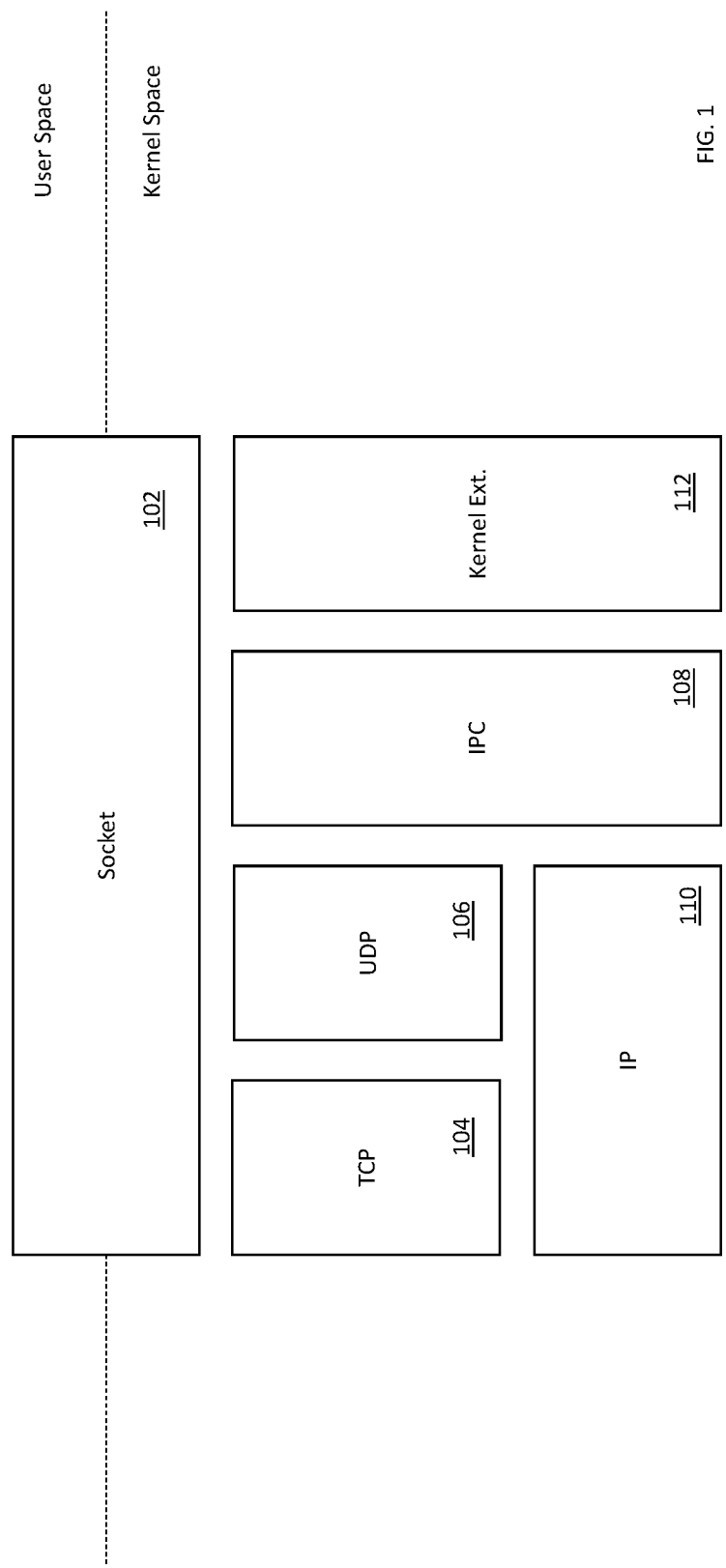

(51) Int. Cl.

| | | |
|---|---|---|
| *G06F 9/54* | (2006.01) | |
| *G06F 9/48* | (2006.01) | |
| *G06F 9/50* | (2006.01) | |
| *G06F 12/10* | (2016.01) | |
| *G06F 13/16* | (2006.01) | |
| *G06F 3/06* | (2006.01) | |
| *G06F 9/46* | (2006.01) | |
| *G06F 12/02* | (2006.01) | |
| *H04L 12/859* | (2013.01) | |
| *H04L 12/851* | (2013.01) | |
| *H04L 12/863* | (2013.01) | |
| *H04L 12/935* | (2013.01) | |
| *H04L 12/861* | (2013.01) | |
| *G06F 9/455* | (2018.01) | |
| *H04L 12/801* | (2013.01) | |
| *H04L 12/841* | (2013.01) | |
| *G06F 9/52* | (2006.01) | |
| *H04L 12/26* | (2006.01) | |
| *G06F 16/23* | (2019.01) | |
| *G06F 21/52* | (2013.01) | |
| *H04L 12/833* | (2013.01) | |
| *H04L 12/835* | (2013.01) | |
| *H04L 12/823* | (2013.01) | |
| *H04L 12/865* | (2013.01) | |
| *G06F 21/56* | (2013.01) | |
| *G06F 16/22* | (2019.01) | |
| *H04L 29/12* | (2006.01) | |
| *H04L 29/08* | (2006.01) | |
| *H04L 1/00* | (2006.01) | |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(58) Field of Classification Search
CPC . H04L 47/193; H04L 47/283; H04L 47/2458; H04L 47/32; H04L 49/30; H04L 49/9052; H04L 43/0864; H04L 1/0061; H04L 61/103; H04L 61/2542; H04L 67/146; G06F 15/17331; G06F 9/545; G06F 9/4881; G06F 9/5016; G06F 9/461; G06F 9/5022; G06F 9/542; G06F 9/45558; G06F 9/5005; G06F 9/52; G06F 9/50; G06F 3/0604; G06F 3/0631; G06F 3/0644; G06F 3/0673; G06F 13/1668; G06F 12/10; G06F 12/023; G06F 2221/034; G06F 2221/032; G06F 2009/45595; G06F 2212/657; G06F 16/2365; G06F 16/2228; G06F 21/568; G06F 21/52; G06F 2209/5011
See application file for complete search history.

(56) References Cited

U.S. PATENT DOCUMENTS

| | | | |
|---|---|---|---|
| 7,152,231 | B1 | 12/2006 | Galluscio et al. |
| 7,398,382 | B2 | 7/2008 | Rothman et al. |
| 7,403,542 | B1 | 7/2008 | Thompson |
| 7,506,084 | B2 | 3/2009 | Moerti et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,941,682 | B2 | 5/2011 | Adams |
| 8,214,707 | B2 | 7/2012 | Munson et al. |
| 8,230,248 | B2 | 7/2012 | Dance et al. |
| 8,255,725 | B2 | 8/2012 | Shimazaki et al. |
| 8,352,624 | B2 | 1/2013 | Zimmerman et al. |
| 8,555,099 | B2 | 10/2013 | Marinkovic et al. |
| 8,769,168 | B2 | 7/2014 | Moertl et al. |
| 9,049,179 | B2 | 6/2015 | Luna |
| 9,170,957 | B2 | 10/2015 | Touzni et al. |
| 9,280,360 | B2 | 3/2016 | Xu et al. |
| 9,594,718 | B2 | 3/2017 | Kaushik et al. |
| 9,959,124 | B1 | 5/2018 | Herbeck et al. |
| 9,985,904 | B2 | 5/2018 | Shalev et al. |
| 10,230,608 | B2 | 3/2019 | Tsirkin |
| 10,331,600 | B1 | 6/2019 | Rajadnya et al. |
| 10,534,601 | B1 | 1/2020 | Venkata et al. |
| 2001/0037410 | A1 | 11/2001 | Gardner |
| 2002/0169938 | A1 | 11/2002 | Scott et al. |
| 2003/0061395 | A1 | 3/2003 | Kingsbury et al. |
| 2004/0010545 | A1* | 1/2004 | Pandya ............. H04L 67/34 709/203 |
| 2005/0068897 | A1* | 3/2005 | Arita ............... H04L 69/162 370/235 |
| 2005/0076244 | A1 | 4/2005 | Watanabe |
| 2006/0075119 | A1* | 4/2006 | Hussain ........... H04L 69/162 709/227 |
| 2006/0136570 | A1* | 6/2006 | Pandya ............. H04L 69/16 709/217 |
| 2007/0226375 | A1 | 9/2007 | Chu et al. |
| 2007/0255802 | A1* | 11/2007 | Aloni ............... H04L 69/16 709/217 |
| 2008/0005794 | A1 | 1/2008 | Inoue et al. |
| 2008/0127292 | A1 | 5/2008 | Cooper et al. |
| 2008/0148291 | A1 | 6/2008 | Huang et al. |
| 2009/0240874 | A1 | 9/2009 | Pong |
| 2010/0005014 | A1 | 1/2010 | Castle et al. |
| 2010/0017655 | A1 | 1/2010 | Gooding et al. |
| 2010/0049876 | A1 | 2/2010 | Pope et al. |
| 2011/0035575 | A1 | 2/2011 | Kwon et al. |
| 2011/0083002 | A1 | 4/2011 | Albers et al. |
| 2011/0219208 | A1 | 9/2011 | Asaad et al. |
| 2011/0246742 | A1 | 10/2011 | Kogen et al. |
| 2011/0292936 | A1 | 12/2011 | Wang |
| 2012/0203880 | A1 | 8/2012 | Kluyt |
| 2012/0260017 | A1 | 10/2012 | Mine et al. |
| 2013/0067188 | A1 | 3/2013 | Mehra et al. |
| 2013/0204927 | A1 | 8/2013 | Kruglikov et al. |
| 2013/0205113 | A1 | 8/2013 | Ahmad et al. |
| 2013/0275976 | A1 | 10/2013 | Dawson et al. |
| 2014/0068624 | A1 | 3/2014 | Fuller et al. |
| 2014/0068636 | A1 | 3/2014 | Dupont et al. |
| 2014/0122695 | A1 | 5/2014 | Kulikov et al. |

(56) References Cited

U.S. PATENT DOCUMENTS

| | | |
|---|---|---|
| 2014/0189057 A1 | 7/2014 | Sankoda et al. |
| 2014/0355606 A1 | 12/2014 | Riddoch et al. |
| 2015/0007262 A1 | 1/2015 | Aissi |
| 2015/0081985 A1 | 3/2015 | Archer et al. |
| 2015/0156122 A1 | 6/2015 | Singh et al. |
| 2015/0172345 A1 | 6/2015 | Mantin et al. |
| 2015/0244804 A1 | 8/2015 | Warfield et al. |
| 2015/0261588 A1 | 9/2015 | Liu et al. |
| 2015/0326542 A1 | 11/2015 | Serebrin |
| 2015/0363110 A1 | 12/2015 | Batra et al. |
| 2016/0103480 A1 | 4/2016 | Sanghi et al. |
| 2016/0226957 A1 | 8/2016 | Zhang et al. |
| 2016/0261632 A1 | 9/2016 | Kolhi |
| 2016/0357443 A1 | 12/2016 | Li et al. |
| 2016/0378545 A1 | 12/2016 | Ho |
| 2017/0111283 A1 | 4/2017 | Kumar et al. |
| 2017/0147282 A1 | 5/2017 | Seo |
| 2017/0149890 A1* | 5/2017 | Shamis ............ G06F 15/17331 |
| 2017/0187621 A1 | 6/2017 | Shalev et al. |
| 2017/0187846 A1 | 6/2017 | Shalev et al. |
| 2017/0264497 A1 | 9/2017 | Lim |
| 2017/0286322 A1 | 10/2017 | Garg et al. |
| 2017/0337588 A1 | 11/2017 | Chittilappilly et al. |
| 2017/0371591 A1 | 12/2017 | Xia et al. |
| 2018/0219976 A1 | 8/2018 | Decenzo |
| 2018/0239657 A1 | 8/2018 | Petrbok et al. |
| 2018/0357176 A1 | 12/2018 | Wang |
| 2019/0036893 A1 | 1/2019 | Jiang |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0253351 A1 | 8/2019 | Ihlar et al. |

\* cited by examiner

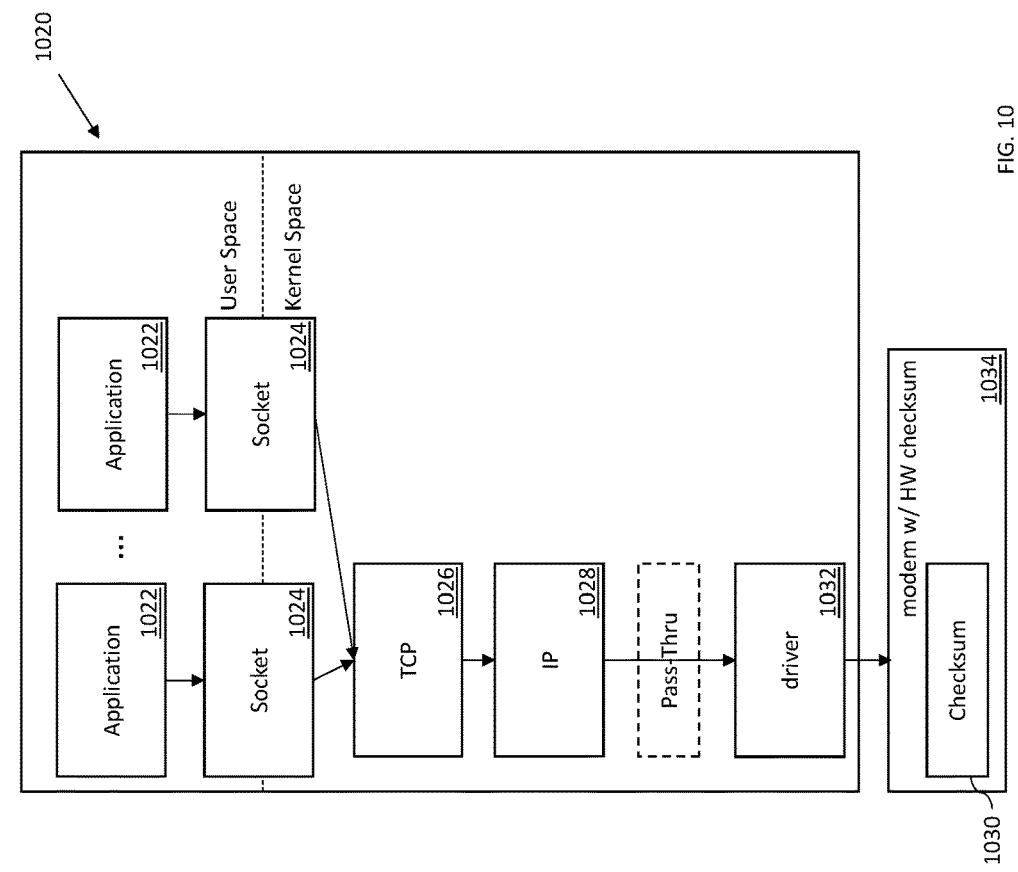
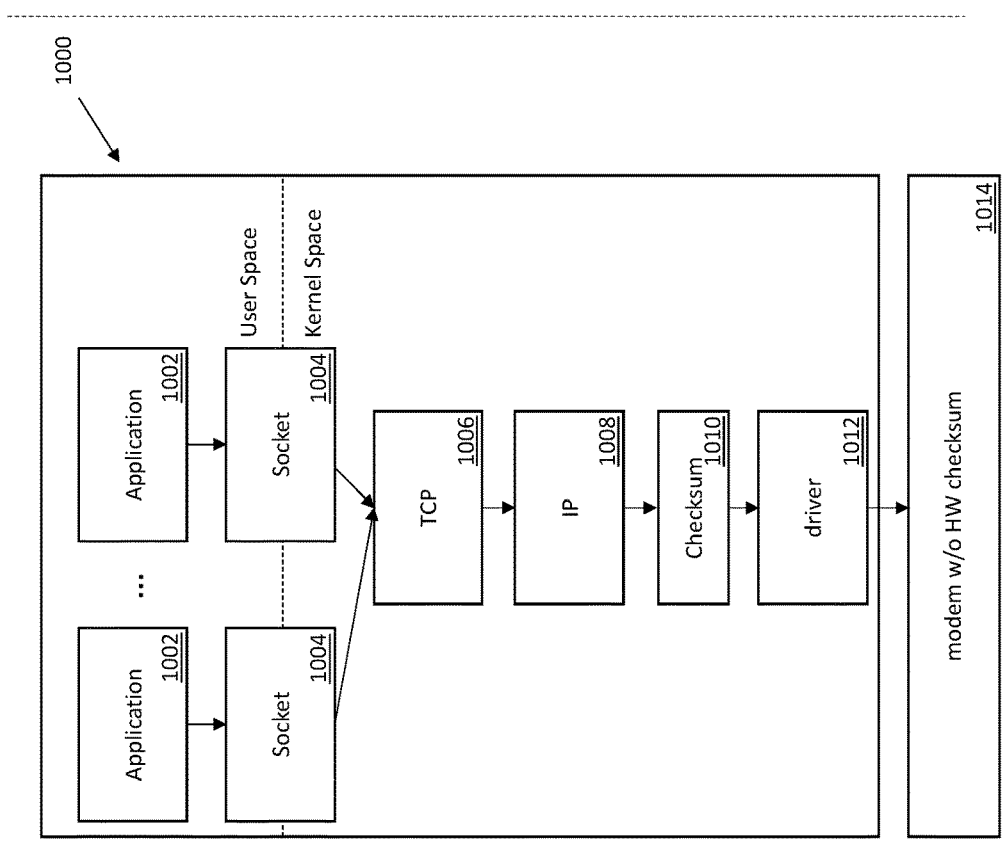
FIG. 10

METHODS AND APPARATUS FOR VIRTUALIZED HARDWARE OPTIMIZATIONS FOR USER SPACE NETWORKING

PRIORITY

This application claims the benefit of priority to U.S. Provisional Patent Application Ser. No. 62/649,509 filed Mar. 28, 2018 and entitled "METHODS AND APPARATUS FOR EFFICIENT DATA TRANSFER WITHIN USER SPACE NETWORKING STACK INFRASTRUCTURES", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", and U.S. patent application Ser. No. 16/365,484, filed herewith on Mar. 26, 2019 and entitled "Methods and Apparatus for Sharing and Arbitration of Host Stack Information with User Space Communication Stacks", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack. More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In a first aspect of the disclosure, methods and apparatus to address contiguous or adjacent memory objects (which are prone to inadvertent memory corruption due to buffer overrun issues) are disclosed, as are methods and apparatus for a user to detect such issues. In one embodiment, data descriptors also known as packet or quantum have a metadata preamble placed at the beginning of the object. This metadata preamble is used to detect any inadvertent overwrite of the metadata. In one variant, each metadata object has a unique red zone pattern which is the XOR of a red zone cookie and the offset of the metadata object in the object's memory region. Red zone cookies are initialized with random numbers on an OS boot. In the event the kernel detects a corruption, the user space process associated with the channel is terminated to prevent further damages.

In a second aspect, methods and apparatus for enhanced security are disclosed. In one embodiment, the architecture maintains a mirrored copy of the packet descriptor memory which is accessible only from the kernel. During packet handoff from user-space to kernel, the user accessible descriptor is validated (against the kernel copy) for any semantic issues and the sanitized data is copied to the kernel mapped descriptor.

In another aspect, methods and apparatus for access control on user space network architecture ports to prevent unauthorized clients from opening channels are disclosed. In one embodiment, an access control mechanism is provided based on one or more attributes associated with a channel client, namely process ID, process executable's UUID, or key blob. A process (e.g., Nexus provider) chooses to select one or a combination of those attributes for securing access to a port of a named instance.

In another aspect, methods and apparatus for RST flood detection and mitigation are disclosed. In one embodiment, mechanisms to prevent SYN flood and RST flood attacks originating from the user space stack are provided. A USNSI flow-switch implements flow tracking logic which can detect SYN flood and RST flood to prevent these attacks originating from a device. If an attack is detected, the flow-switch will rate-limit the SYN and RST packets coming from the user space stack.

In another aspect, methods and apparatus for split TX and RX packet pools (direction-specific DMA access for security) are disclosed. In one embodiment, buggy or hostile devices are prevented from using PCIe-mapped buffers to attack the host, such as by overwriting the content of in-use buffers, or performing timing/time-of-use based attacks. A USNSI setup maps segments to use the minimum possible memory access permissions on receive and transmit packet buffers.

In another aspect, methods and apparatus for use of randomized memory segment sizes are disclosed. As noted, buggy or hostile devices may use PCIe-mapped buffers to attack the host; to help mitigate this vulnerability, the system will randomize the PCIe address space mappings, to make it difficult for an attacker to find vulnerable host-side resources. To help support this security protection, A USNSI may in one variant randomize its segment size by randomizing the number of pages per segment at the time segments are allocated. In another variant, a USNSI may also randomize packet order within a segment, to make it more difficult to correlate packet address to position within a segment.

In another aspect, methods and apparatus for Device TOCTOU attack mitigation are disclosed. In one embodiment, the process (e.g., Nexus) makes a kernel only copy before accessing device supplied data, all subsequent "sanity" checks and uses on the data are carried out on the kernel only copy. Even if a compromised device launches TOC-TOU attack, the kernel detects and uses the consistent kernel-only copy that is not affected.

In another aspect, methods and apparatus for managing entitlements to access statistics and Nexus operations are disclosed. In one embodiment, entitlements checks for privileged operations are conducted only by processes possessing such entitlements, e.g. trusted processes.

In another aspect, methods and apparatus for leveraging RTT estimation data for bounds checking are disclosed. RTT measurement is a critical value for TCP operations such as retransmission and fast recovery; hence, in one embodiment, the TCP stack(s) are in user space, and the kernel also performs its own rough RTT using flow tracker in the flow-switch. To accept measurements from user space, the kernel conducts a "sanity" check with its estimated upper and lower bounds. Only the RTT samples that passed the kernel sanity check could be published to other TCP stack instances.

In another aspect, methods and apparatus for malicious statistics detection before folding into trusted statistics are disclosed. In one embodiment, a process (e.g., the Nexus) also instantiates a shadow kernel-only statistics object in addition to the user space protocol stack instance shared statistics object. The kernel-only statistics object stores historical values of the user space protocol stack statistics. Before accepting the user space protocol stack statistics, the Nexus derives a delta of each uTCP statistics snapshot with the historical value and conducts an anomaly detection. Also for critical statistics, such as cellular data usage, the USNSI in one variant only relies on trusted flow-switch kernel observed statistics.

In another aspect, methods and apparatus for preventing IP Address/port spoofing are disclosed. In one embodiment, the TCP/IP stacks is/are in user space, a flow-switch is used to performs a flow 5-tuple lookup in the kernel with the registered flows before packets are transmitted; e.g., to make sure the sender has the 5-tuple registration. Any packets with un-matching 5-tuple and various other metadata such as flow ID would be dropped or otherwise handled.

In another aspect, methods and apparatus for trusted TFO & ECN are disclosed. In one embodiment, a TCP stack that supports both TCP Fast Open (TFO) and Explicit Congestion Notification (ECN) is used; both the TCP options are enabled/disabled based on per network heuristics maintained on the system, so as to avoid using TFO and ECN on networks that either do not support these options, or blacklist devices if the options are present in the TCP header.

In one variant, the ECN and TFO heuristics is updated each time a TCP connection experiences a success or failure when using TFO or ECN, and the USNSI TCP protocol stack runs in the user process's context, and all processes can indicate to the system heuristics a failure of TFO or ECN—however, only processes that are trusted on the system can update the heuristics with TFO or ECN success. This prevents malicious apps from incorrectly updating TFO or ECN success on networks that do not support these options.

In another aspect, methods and apparatus for driver managed pool are disclosed. In one embodiment, a system global packet buffer pool is obviated in favor of a packet buffer pool managed and owned by a driver that can be dedicated for that driver, or shared among several drivers. The owner of the pool handles notifications to dynamically map and unmap the pool's memory from its device IOMMU aperture. This same notification can also "wire/un-wire" the memory as needed. Read and write attributes can also be restricted on both the host and the device side based on the I/O transfer direction for added security.

In another aspect, methods and apparatus for multi-buflet descriptors (array) are disclosed. In one embodiment, jumbo frames are supported in a memory efficient manner; rather than always allocating enough memory to hold the largest possible frame size, a packet can instead hold an array of buflets, each buflet points to a fixed size block of memory allocated from a pool. The binding between the buflets and a packet can be formed on demand. This scheme allows, inter alia, a packet to have a variable number of buflets depending on the size of the payload. This also makes it easier to support scatter-gather style DMA engines by handing it buflets, which are uniform by nature.

In another aspect, methods and apparatus for segment-based IOMMU/DART mapping are disclosed. In one embodiment, use of a look-up of an I/O bus address is at least partly obviated in favor of use a memory segment which is guaranteed to be a multiple of a page size as the smallest memory unit for I/O mappings. Each memory segment is then divided into several packet buffers. Only one I/O bus address lookup is required for all the packet buffers within that segment, and this I/O bus address can also be cached within the segment object.

In another aspect, methods and apparatus for split metadata and buffer management are disclosed. In one embodiment, exposing packet metadata to the hardware such as Wi-Fi chips and cellular baseband is obviated in favor of use of different memory regions for the packet metadata and the packet buffers to prevent malicious hardware from accessing the packet metadata. In one variant, only the packet buffers are I/O mapped and visible to the device.

In another aspect, methods and apparatus for a user packet pool are disclosed. In one embodiment, an efficient scheme is provided that enables dynamic scale-up and down of a memory available to each process according to the current throughput requirements. A user packet pool is used in one variant to achieve this; it attempts to reuse the efficient packet I/O mechanism to move memory buffers across kernel-user boundary and utilizes channel synchronization statistics to dynamically scale the amount of memory available to each channel.

In another aspect, methods and apparatus for user pipe dynamic memory management using sync statistics are disclosed. In one embodiment, a user pipe process (e.g., Nexus) provides an efficient inter-processor communication (IPC) between user space processes using shared memory. Since the number of processes using IPC on an iOS device can be significant, an efficient mechanism is provided so as to keep the shared memory usage to minimum without compromising on the data throughput. In one variant, maintaining a fair estimate of immediate memory usage of user (working set) depending on the recent past usage is performed; the user pipe Nexus maintains a weighted moving average statistics of memory used during each synchronization, and can also keep adjusting the channel memory accordingly as needed.

In another aspect, methods and apparatus for purgeable memory (compressible and swappable) are disclosed. In one embodiment, the USNSI architecture allocates all memory as purgeable and wires memory on demand when needed.

In another aspect, methods and apparatus for memory region/arena: purpose, layout, access protection, sharing model are disclosed. In one embodiment, an efficient and generic mechanism to represent and manage the shared memory objects of varying types and sizes which are memory mapped to the user space and/or kernel space is disclosed. In one such embodiment, the USNSI architecture uses shared memory for efficient packet I/O, network statistics and system attributes (sysctl). USNSI arena is a generic and efficient mechanism to represent these various types of shared memory subsystems and their backing memory caches, regions and access protection attributes. Channel schema is a representation of the shared memory layout for user space process to be able to efficiently access various channel objects.

In another aspect, methods and apparatus for mirrored memory regions are disclosed. In one embodiment, to implement security validation and sanitation of shared memory objects on user-kernel boundary, a kernel-only copy of these objects is maintained, and an efficient method to allocate and retrieve these objects is provided. In one variant, mirrored memory object(s) is/are created, which share the same region offset as that of the associated object and hence can be retrieved quickly from the attributes of the associated object.

In another aspect, methods and apparatus for channeling defunct (map overrides) are disclosed. In one embodiment, networking memory associated with a process when it is backgrounded is freed; redirection of the shared memory mapping of the task so that they are backed with anonymous (zero-filled) pages is used to free the underlying memory. When the task is resumed, the user space shared memory accessor functions (e.g., libsyscall wrappers) have the logic to detect a defuncted state of the shared memory, and efficiently and effectively handle errors due to data inconsistencies.

In another aspect, methods and apparatus for conducting one or more "reaps" based on idleness are disclosed. In one embodiment, efficient and aggressive pruning and purging of idle resources are utilized via, inter alia, mechanisms which can detect idle resources and can offload pruning and purging of these resources in a deferred context.

In another aspect, methods and apparatus for management of daemon "jetsam" are disclosed. In one embodiment, a memory management module that keeps track of the memory consumed by the network protocols is provided; depending on memory usage, the module indicates to the system that active work is being performed by the protocols on behalf of the application. Once the buffers are returned to the memory management module, the module indicates to the system that the active work is complete. This prevents the system from targeting processes that consume more memory while doing active work.

In another aspect, methods and apparatus for TCP memory "defunct" management are disclosed. In one embodiment, data inconsistency issues when a channel is defunct during processing of TCP packet are avoided by use of a shadow copy of the original TCP header in heap memory. Once TCP processing begins, it uses the copy of the TCP header to make decisions which prevents any inconsistency or data corruption. The validation is done prior to handing off the payload data to the layer above TCP, as well as within the TCP input processing paths.

In another aspect, methods and apparatus for flow classification are disclosed. In one embodiment, USNSI packets have a struct_flow as part of packet metadata which contains most information that those layers need, and it is carried into BSD/user space, etc. The contents of this structure are filled once by the flow-switch.

In another aspect, methods and apparatus for flow management are disclosed. In one embodiment, flow lifecycle, e.g. flow creation, destroy, which interfaces with calls/events from other components, is managed. In one variant, a flow manager is the entity that provides such interface. It accepts calls to create/destroy/defunct flows. It also shuts down flow when the flow owner process exits. This allows proper clean-ups to be done regardless of how the process terminates.

In another aspect, methods and apparatus for flow entry management are disclosed. In one embodiment, a mechanism to facilitate efficient packet forwarding within a USNSI flow-switch includes packet forwarding based on the entries of a flow table, which allows facilitation of optimal forwarding data plane logic, where e.g., a multiple network interface Nexus is fused together to form a direct conduit for sending packets to one another. In another aspect, methods and apparatus for flow action management are disclosed. In one embodiment, a flow-switch flow carries action on packets for a given flow; a mechanism is disclosed whereby possible actions that can be applied to packet, e.g. forward to a flow-switch port to user space protocol stack, forward to BSD stack, drop, transform, etc., are defined. This approach allows for, inter alia, an efficient way to apply traffic rules without involving separate database lookups.

In another aspect, methods and apparatus for flow route management are disclosed. In one embodiment, a USNSI flow route comprises a cache around those BSD info, such that for USNSI flow packets can find those information within USNSI context along with flow lookup. The flow route is notified when related events happen, e.g. route change, ARP expire, to maintain consistency. The flow routes allow for packets going out of the system via USNSI channels to not incur per-packet routing table lookup costs.

In another aspect, methods and apparatus for flow tracking are disclosed. In one embodiment, a process (e.g., flow-switch) has a flow tracker that passively tracks flow state/statistics during flow classification and classifier. It provides KPI for other component to query flow states and statistics. It also implements pro-active actions in cleaning up flows that are, e.g., deemed to be terminated (by both ends) and not expecting any more data.

In another aspect, methods and apparatus for achieving low latency for urgent packets using flow tracking are disclosed. In one embodiment, urgent packets like DNS queries/TCP control packets are identified and processed (e.g., via a flush/notify) when detected to ensure we deliver them with low latency. This allows for, inter alia, dynamic adjustment of the notifications posted to the user space process depending on the contents of the packets.

In another aspect, methods and apparatus for flow purging/"defunct-ing" are disclosed. In one embodiment, a flow tracker passively updates flow state; a process (e.g., flow-switch) actively scans through all flows and find those dead flows and close them; and orthogonally during defunct, a process (e.g., assertion) calls in to defunct flows when a target process goes suspended.

In another aspect, methods and apparatus for dynamic growing/shrinking of flow-switch ports are disclosed. In one embodiment, a process (e.g., flow-switch) breaks up port space into small, contiguous chunks and manages in that level or granularity; data structures are grown and shrunk on demand. This allows for, inter alia, sparse port usage.

In another aspect, methods and apparatus for sharing of packet pool among trusted ports is disclosed are disclosed. In one embodiment, one or more packet pools are configured to be shared across process, e.g. between two processes, between kernel and trusted first-party apps. Thus, packet movement doesn't require copying, and this allows for zero-copy data transfers between any of the entities in instances where the configuration allow for such.

In another aspect, methods and apparatus for efficient copy-checksum mechanism being used in e.g., a process/user space stack are disclosed. In one embodiment, the flow-switch presents to the user space protocol stack as a virtual network port, which provides similar functions that today's hardware network device provides, e.g. checksum offloading, etc. For a flow-switch process, the copying is inherently necessary for security reason when transitioning between trust domains (e.g. from user space to kernel). Thus, in one variant, a combined copy and checksum of the data is used, so the user space does not need to scan through the data and compute a checksum.

In another aspect, methods and apparatus for IP fragment management are disclosed. In one embodiment, a lightweight packet reassemble for channel (as if perfect network condition) is used, wherein a process (e.g., flow-switch) first accumulates all fragments as they come (e.g., using IP address and IP ID, per IP reassembly RFC), then performs a single flow lookup, and then delivery of all fragments to user space. To the user space protocol stack point of view, the flow-switch provides an in-sequence delivery network abstraction, which inter alia, facilitates handling/receiving of fragments in a user space protocol stack.

In another aspect, methods and apparatus for user space stack flow control are disclosed. In one embodiment, a user space TCP/IP stack architecture is used wherein the stack instance and the network driver are operating in different domains (user space & kernel space). An efficient mechanism is provided for the user space stack to determine the admissibility state of a given flow in the stack instance. In one variant, USNSI channels provide a flow advisory table in shared memory which is updated by the kernel and consulted by the user space stack to flow control a given flow. In essence, this table provides admission control information to the user space stack.

In another aspect, methods and apparatus for user space stack flow advisory are disclosed. In one embodiment, an efficient mechanism is provided to signal the user space stack from kernel space to "flow control" or "resume" a given flow in the stack instance. In one variant, USNSI channels utilize a kernel event mechanism with a specific type to indicate the user space stack about any updates to the flow advisory state in kernel which is reflected in the "flow advisory table" maintained in shared memory. Each row in the table represents information about the flow, as well as the advisory state (e.g. flow-controlled, etc.) In another aspect, methods and apparatus for user space stack schema are disclosed.

In one embodiment, a common AQM (Active Queue Management) functionality is provided for a network interface hosting multiple and differing stack instances (user space protocol stack and Kernel protocol stack); a USNSI process is a common entry point for the in-kernel BSD stack and the user space stack. In one variant, a flow-switch nexus handles the different packet descriptor schemes and converts them to the packet descriptor scheme being used by the underlying network driver before enqueuing the packets to the AQM queues. It also implements the appropriate mechanisms to provide flow control and advisory feedback from the AQM queues to the different stack instances.

In another aspect, methods and apparatus for host stack coexistence and NetNS for port tuple arbitration are disclosed. In one embodiment, an efficient mechanism to share and arbitrate e.g., the 5-tuple network namespace (i.e. access to use which port on which source address, etc.) is provided. In one variant, a USNSI architecture implements a shared namespace manager (NetNS) to enable sharing and arbitration of the network namespace between the various stack instances.

In another aspect, methods and apparatus for host stack coexistence are disclosed. In one embodiment, a USNSI leverages existing functions in a BSD stack to handle those types of packets. A process (e.g., flow-switch), when seeing those packets, forward them to BSD stack, and the USNSI then registers callbacks for events from those BSD stacks, as well as query information for its flow management, etc.

In another aspect, methods and apparatus for system-wide sysctl via shared memory (RO) are disclosed. In one embodiment, a USNSI implements a system-wide sysctl shared memory region shared by all processes to minimize memory usage; in one variant, it is controllable by user via sysctl command to allow easy tuning, and is readable and controllable by kernel network stack if needed.

In another aspect, methods and apparatus for leveraging shared memory for user space stack management and statistics are disclosed.

In another aspect, methods and apparatus for a trusted RTT estimation based on passive observation are disclosed. In one embodiment, a user space protocol stack is provided a feedback mechanism to tell the kernel about its packet processing state, e.g. the processing time of each packet as compared to kernel protocol stack. A flow tracker passively and selectively timestamp TCP packets and computes the processing time of RX packets and network latency of TX packets. This information is kept in the flow entry for bounds checking and scheduler hint, as well as diagnostic purpose.

In another aspect, methods and apparatus for implementing packet hooks (e.g., NLC v2 (NetEm)) are disclosed. In one embodiment, a NetEm packet scheduler on Rx/TX is used to simulate those networking conditions, to simulate hardware features, etc. This is done by leveraging a USNSI's built-in infrastructures, e.g. pre- and post-sync and notify operations on the rings/queues.

In another aspect, methods and apparatus for header compression and decompression are disclosed.

In another aspect, methods and apparatus for batching optimizations in e.g., a Bluetooth daemon are disclosed. In one embodiment, the methods and apparatus reduce the per-packet cost for Bluetooth communication via packet batching heuristics in a Bluetooth user space driver to efficiently move packet batches over USNSI channels, to/from agent processes, as well as to/from kernel UART HW driver.

In another aspect, methods and apparatus for replacing socket-based IPC with channel are disclosed.

In another aspect, methods and apparatus for a mitigation thread dynamic threshold table are disclosed. In one embodiment, an interrupt mitigation scheme helping to reduce the interrupt processing load while preserving low latency and throughput is described.

In another aspect, methods and apparatus for Using RX mitigation and RX ring size to normalize packet flow in bursty cellular conditions are disclosed. In one embodiment, the bursty packet load at the network interface is normalized by adjusting the mitigation logic thresholds and input queue size to get a uniform throughput in bursty scenarios.

In another aspect, methods and apparatus for closed loop scheduling using user space protocol stack packet processing time to optimize user stack latency are disclosed. In one embodiment, an RTT estimation technique built in flow-switch is used to track the user stack processing time and form a close loop along with scheduler and CPU frequency adjuster. The closed loop controller gets input from flow-switch local RTT (user space network stack processing time) estimation, CPU frequency and process scheduling properties, the output is next CPU frequency and process priority.

In another aspect, methods and apparatus for a submission/completion queue driver are disclosed. In one embodiment, Device drivers require a common and flexible queueing model in the device driver abstraction layer for packet I/O. The queues hide the underlying USNSI rings, and also reduces the locking contention between the driver work loop and the USNSI threads.

In another aspect, methods and apparatus for receive submission/completion queues that work with buffers instead of packets are disclosed.

In another aspect, methods and apparatus for driver doorbell management and refill are disclosed. In one embodiment, a doorbell notifies the driver layer when one or more packet is available; a USNSI Family queries the driver for the amount of free space available, in in either packets or bytes. A refill operation is then requested with this free space information which will dequeue a bounded amount of packets from the AQM queue and pass them along to the drivers ring/queue for immediate consumption.

In another aspect, methods and apparatus for queue-level reporting for network scheduling are disclosed. In one embodiment, In another aspect, methods and apparatus for providing possible data transmission opportunities (enabling efficient resource allocation) are disclosed.

In another aspect, methods and apparatus for kernel bypass, including transparent security (IPsec) gateway, are disclosed. In one embodiment, a USNSI will allow most IPsec components to be in user space. Installing new components will only require restarting the user space IPsec forwarding daemon. In addition, the user space transformation plane allows for significantly better performance due to the elimination of costs associated with in-kernel design and implementation.

In another aspect, methods and apparatus for bridging, forwarding and routing are disclosed.

In another aspect, methods and apparatus for "tapping" on any channel (e.g., libpcap/tcpdump) are disclosed.

In another aspect, methods and apparatus for a test user space TCP stack are disclosed.

In another aspect, methods and apparatus for Nexus statistics (e.g., flow-switch statistics)/Channel statistics (Ring statistics/Sync statistics)/Flow statistics are disclosed.

In another aspect, methods and apparatus for a scheduling hint added to TCP RTT are disclosed.

In another aspect, a computerized device implementing one or more of the foregoing aspects is disclosed and described. In one embodiment, the device comprises a personal or laptop computer. In another embodiment, the device comprises a mobile device (e.g., tablet or smartphone).

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device.

In yet another aspect, a software architecture is disclosed. In one embodiment, the architecture includes both user space and kernel space, separated via a software or virtual partition.

In one aspect, a method for copy and checksum optimizations with user space communication stacks is disclosed. In one exemplary embodiment, the method includes: configuring a first user space application with pass-through checksum functionality; reading data from a first pool of resources associated with the first user space application; calculating a checksum value based on the data; and storing the data in a second pool of resources associated with a hardware driver.

In one variant, reading the data comprises reading a plurality of word segments. In one such variant, calculating a checksum value based on the data comprises a running summation of the plurality of word segments. Additionally, the variant may store the data in the second pool of resources comprises storing the checksum value. In some implementations, reading the data from the first pool of resources is performed by a kernel space process. In some implementations, calculating the checksum value is performed by a kernel space process.

In one variant, the hardware driver is configured for a network interface card. In one such variant, the hardware driver does not provide checksum functionality.

In one aspect, a system configured for copy and checksum optimizations with user space communication stacks is disclosed. In one embodiment, the system includes: an application that comprises a user space communication stack; a first pool of dedicated memory resources for the application; a second pool of dedicated memory resources for a kernel space hardware driver; a kernel space flow-switch configured to copy-checksum data from the first pool of dedicated memory resources to the second pool of dedicated memory resources; and kernel space logic. In one exemplary embodiment, the kernel space logic is configured to: read data from the first pool of dedicated memory resources; calculate a checksum value based on the data; and store the data in the second pool of dedicated memory resources.

In one variant, the kernel space hardware driver comprises a network interface card. In one such variant, the network interface card is configured to transmit IP data. In one such variant, the network interface card does not include a checksum functionality. In one such variant, the network interface card operates without a checksum functionality. Additionally, the user space communication stack may operate without the checksum functionality. In fact, the user space communication stack may operate in a pass-through mode.

In one variant, the kernel space logic is configured to read data from the first pool of dedicated memory resources in word segments. In one such variant, the kernel space logic is configured to calculate the checksum from the word segments.

In another variant, the kernel space logic is prioritized over user space logic.

In one aspect, a non-transitory computer readable apparatus comprising a storage medium having one or more computer programs stored thereon is disclosed. In one exemplary embodiment, the one or more computer programs, when executed by a processing apparatus are configured to: read one word of data from a first pool of memory; calculate a checksum value based on the one word of data; and store the one word of data in a second pool of memory.

In one variant, the first pool of memory is dedicated to a first application comprising hardware driver, the hardware driver receiving data for a user space networking stack.

Other features and advantages of the present disclosure will immediately be recognized by persons of ordinary skill in the art with reference to the attached drawings and detailed description of exemplary embodiments as given below.

All figures © Copyright 2017-2019 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "METHODS AND APPARATUS FOR CONTROL OF A JOINTLY SHARED MEMORY-MAPPED REGION", each of which being incorporated herein by reference in its entirety, it will be recognized by those of ordinary skill that the present disclosure is not so limited.

Existing Network Socket Technologies—

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating ~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, 3$^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, 3$^{rd}$ party kernel extensions can be dangerous and/or undesirable. As previously noted, software applications are restricted for security and stability reasons; however the kernel is largely unrestricted. A 3$^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the 3$^{rd}$ party software developer. This heightened level of access may raise privacy concerns (e.g., the 3$^{rd}$ party developer may have access to browsing habits, etc.).

Existing Performance Optimization Technologies—

Figure 2:
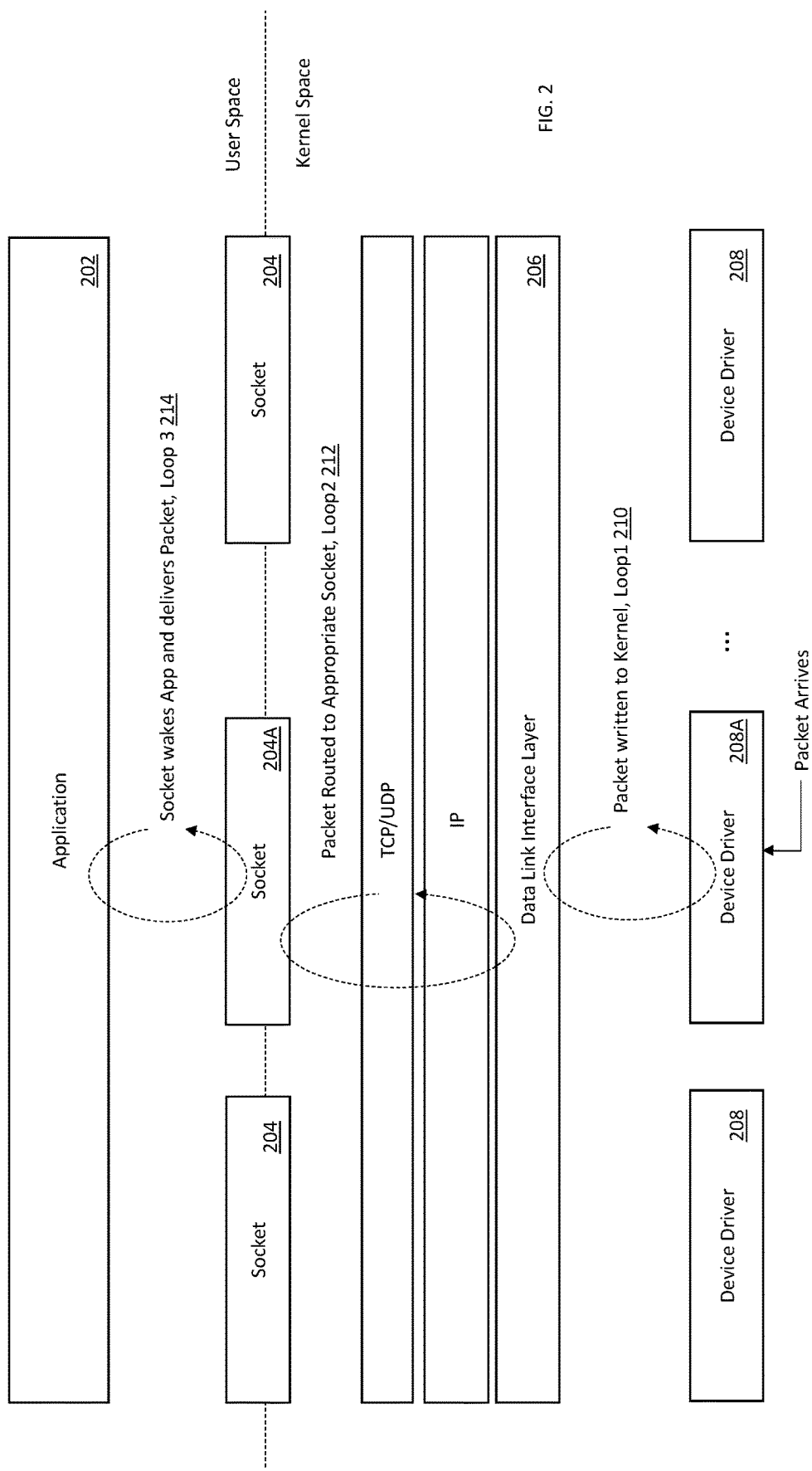

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission. As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
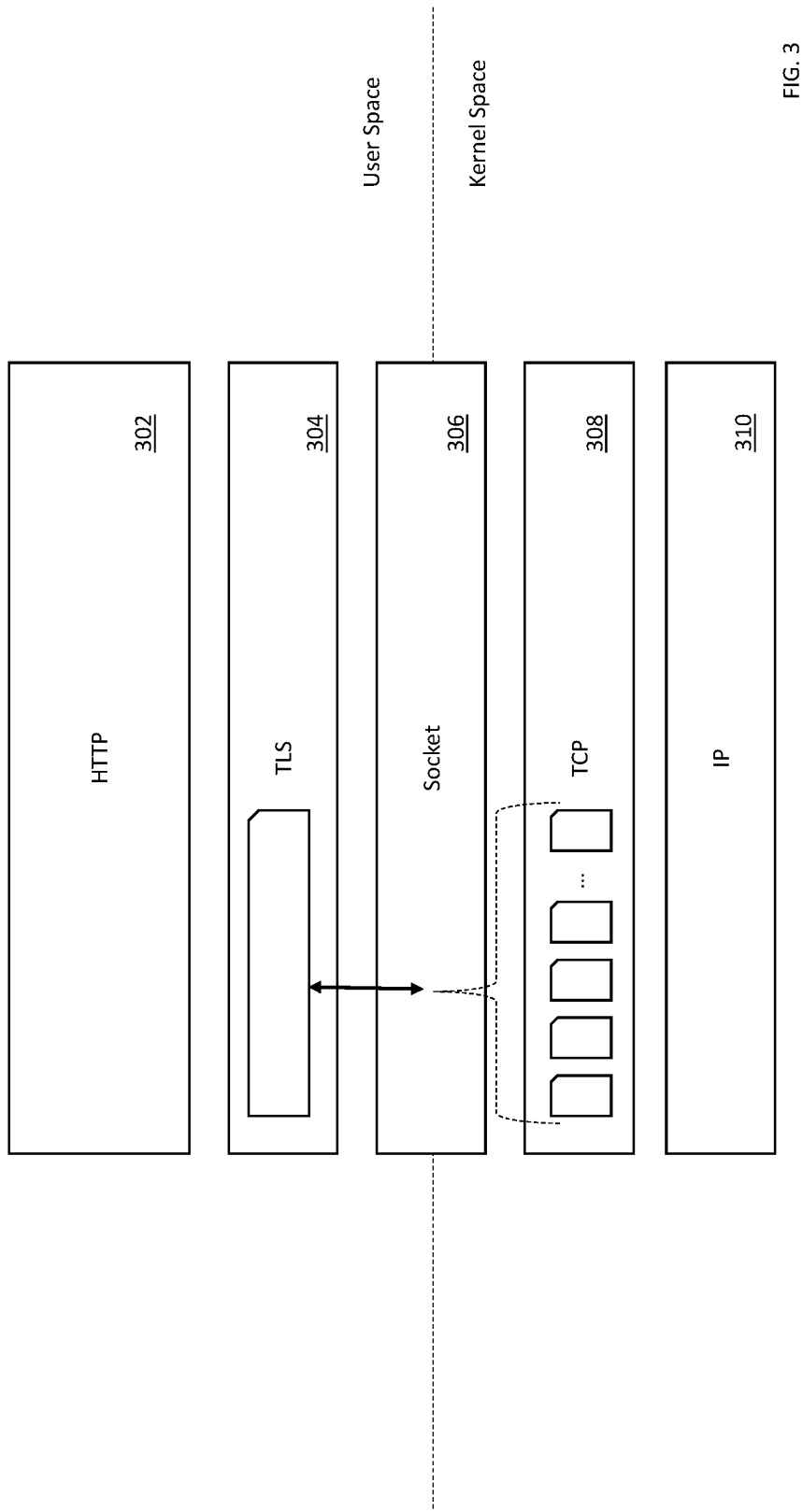

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
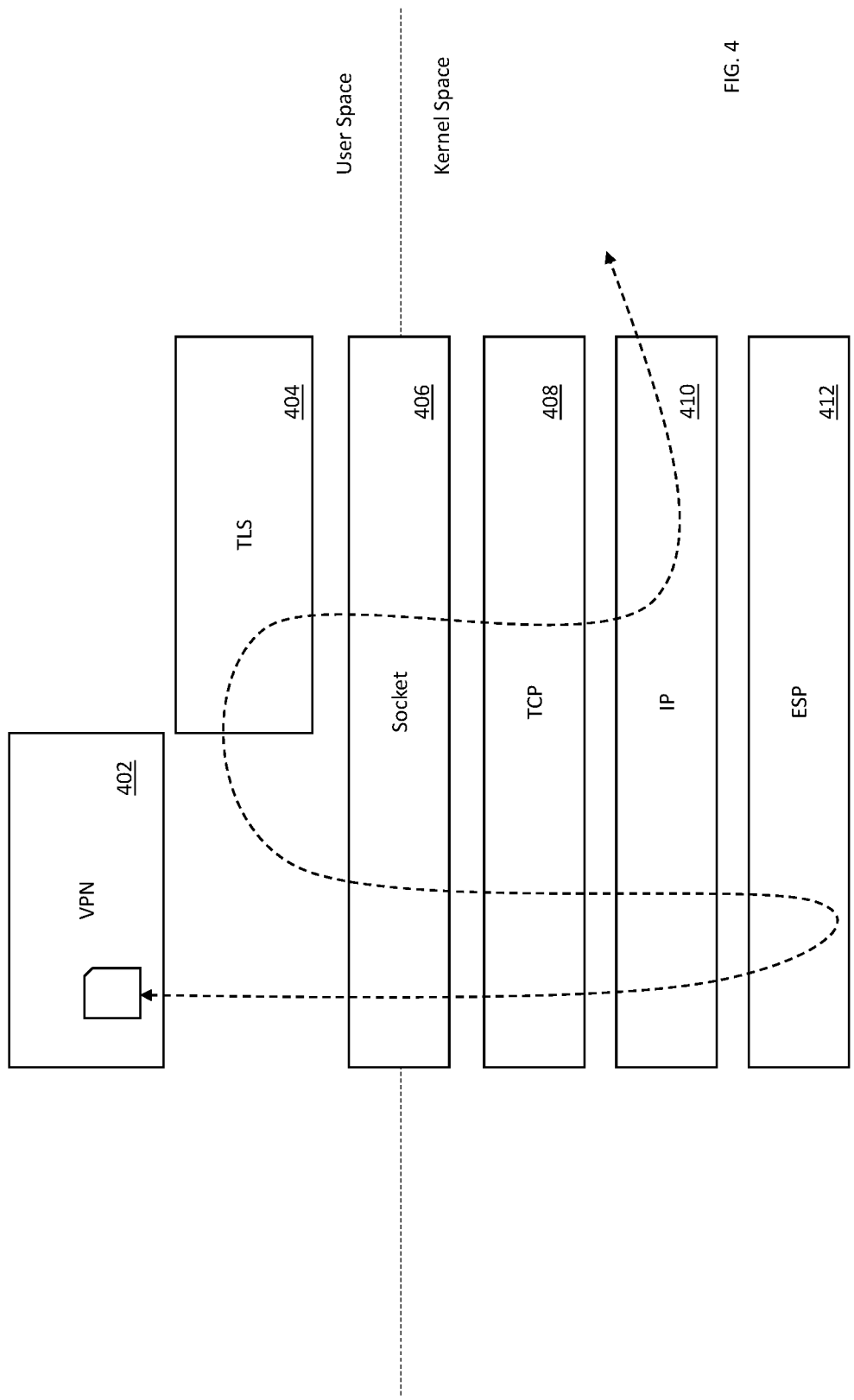

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
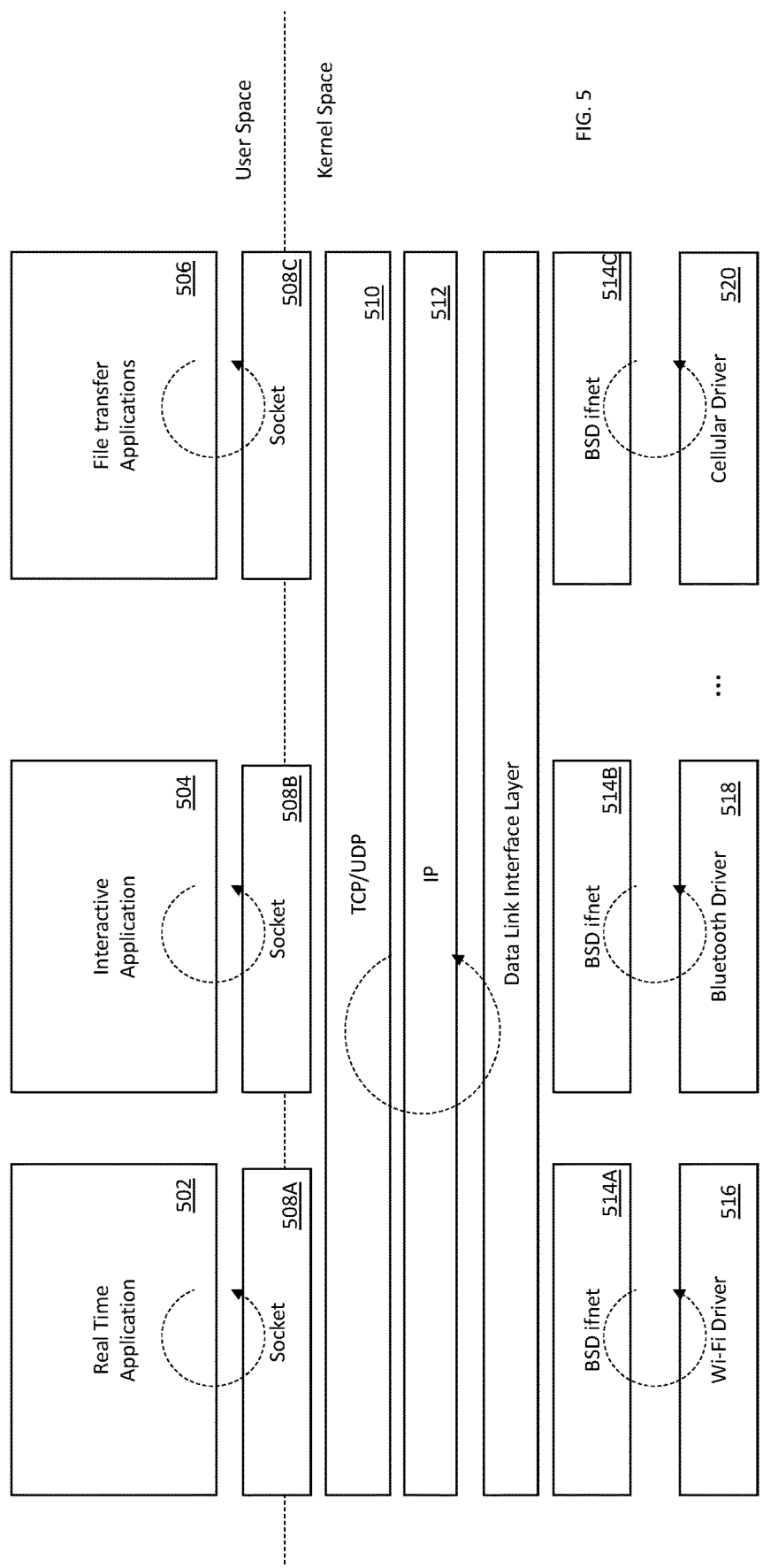

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains. Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
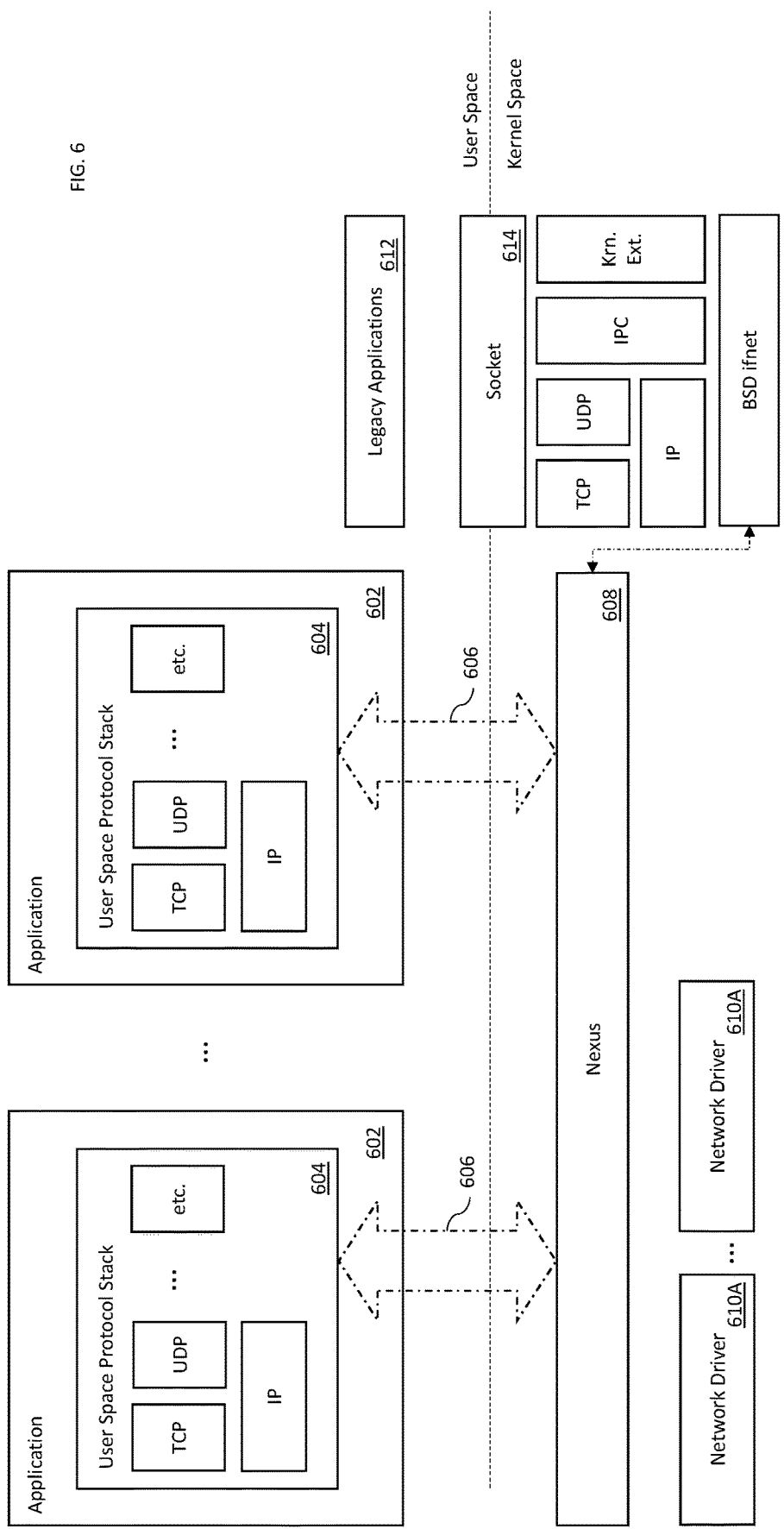

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus—

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the nexus 608 may additionally ensure that there is fairness and/or appropriately prioritize each of its connected stacks. For example, within the context of FIG. 6, the nexus 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary nexus 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Onloading Offloading, discussed infra).

Exemplary Network Extensions

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/or other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent). In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading

In the Foregoing Discussions, the Improvements to User Space Operation May be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack

Figure 7:
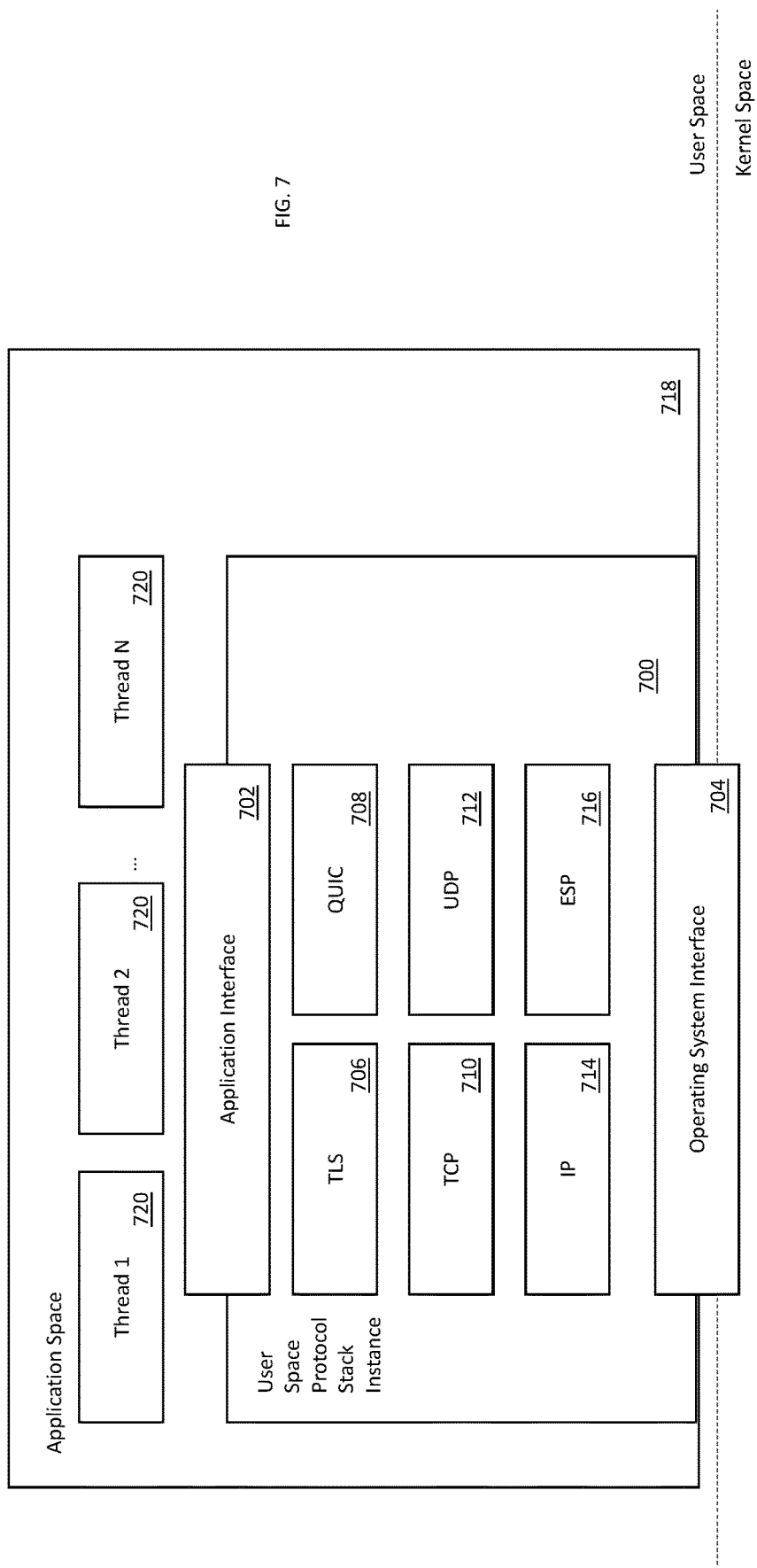

Referring now to FIG. 7, one logical block diagram of an exemplary user space networking stack 700 is depicted. As shown, the user space networking stack 700 includes an application interface 702, and an operating system interface 704. Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack.

Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation

Figure 8:
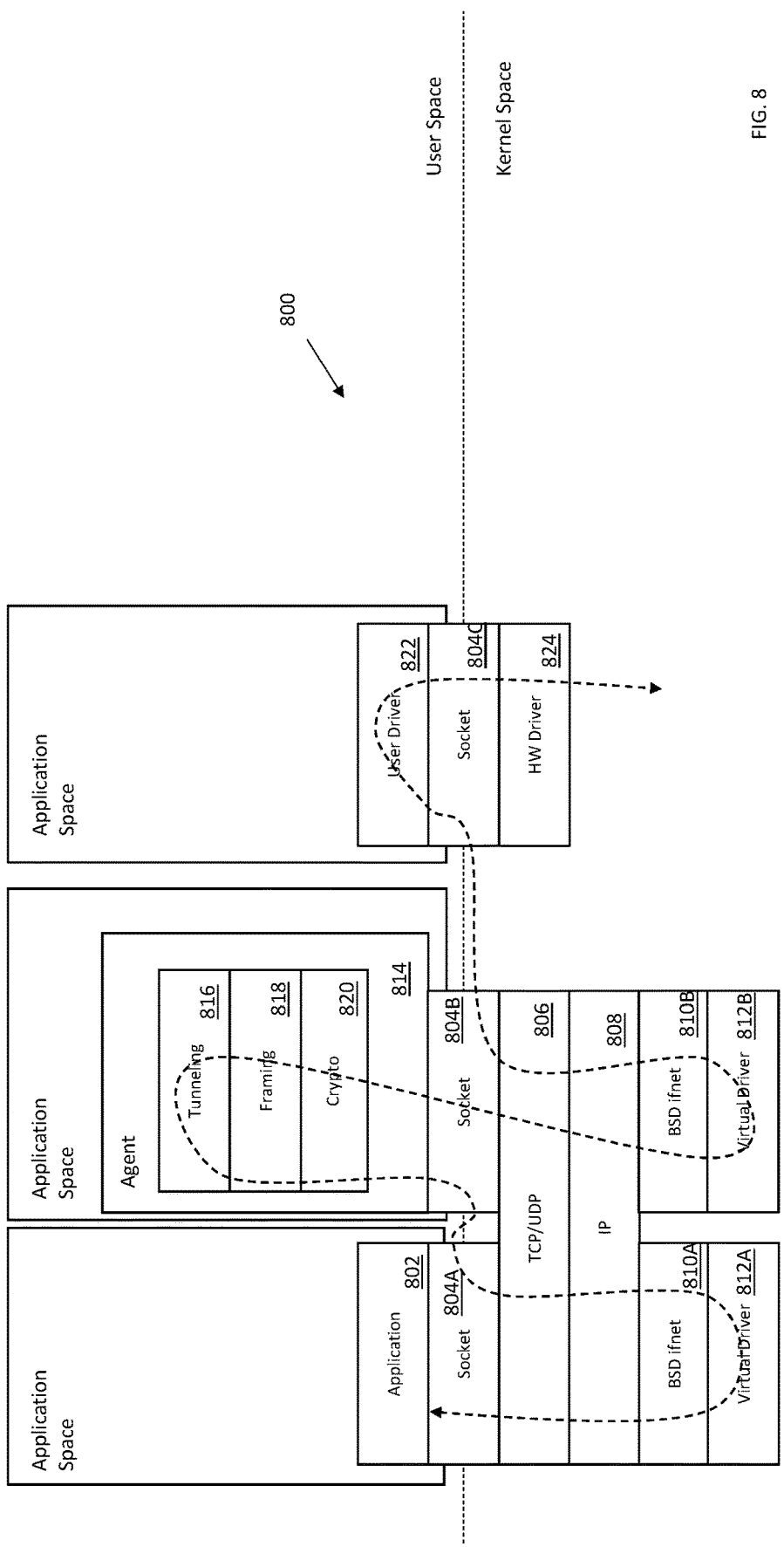

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
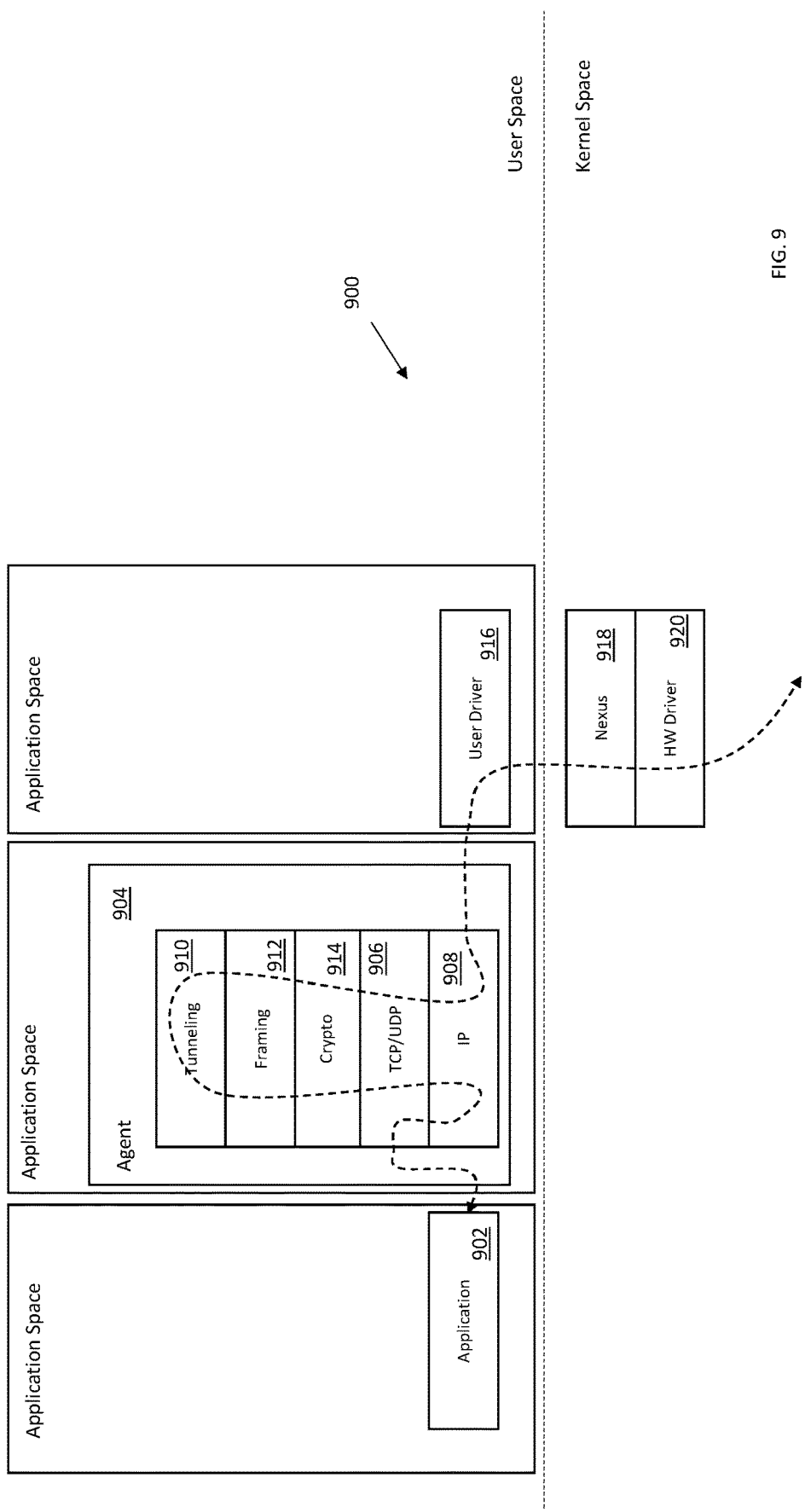

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Virtualized Hardware Enhancements—

Existing devices often source components from a variety of different vendors. Multi-sourcing allows for price competition. Different components may offer different levels of functionalities. And, each vendor of a particular component may align the level of implemented functionality to the required functionality or functionalities for the particular component, based on the functionality or functionalities implemented by the other components of an existing device. Therefore, an existing device may be made up of a variety of combinations and permutations of multiple components offering different sets of functionalities, as long as the different sets of functionalities combine to support the requisite set of functionalities for the device.

Some manufacturers differentiate themselves by offering low cost solutions. For example, a manufacturer for a particular component of an existing device may offer a minimum level of functionality at a low cost. Such component may rely on certain functionalities to be implemented by other component(s) of the device. Because of the reliance on the other component(s) of the device for the certain functionalities, the required level of functionality for the particular component may be relatively low. Therefore, a manufacturer of a component may differentiate itself by offering the lowest-costing solution for a component by minimizing the level of functionality and associated cost while relying on certain functionalities to be implemented by other components for the device.

On the other hand, other manufacturers differentiate themselves by offering more functionality. For example, a manufacturer for a particular component of an existing device may focus on offering a maximum level of functionality. Such component may alleviate the need of certain functionalities to be implemented by other component(s) of the existing device. Because such component alleviates the need of certain functionalities to be implemented by other component(s) of the existing device, the device may not require as many components to serve the same set of functionalities. Therefore, a manufacturer of a component may differentiate itself by offering the highest level of functionality to lessen the level of functionality required from other components of the device.

Hardware information could be exposed to user space communication stacks. However, hardware specific information should be abstracted (or "virtualized") away from the user space communication stacks for a variety of considerations (e.g., security, privacy, and/or efficiency). To these ends, various embodiments of the present disclosure provide techniques for virtualizing hardware behavior.

Efficient Copy-Checksum Mechanism

Existing TCP/IP formats require that protocol data is provided with an associated checksum. A checksum is a small-sized datum derived from a block of digital data for the purpose of detecting errors that may have been introduced during its transmission or storage. A procedure that yields the checksum from a data input is called checksum function or checksum algorithm. Checksums are often used to verify data integrity. Some examples of the checksum algorithms most used in practice include without limitation: longitudinal parity check, usage of modular sums, Fletcher's checksum, Adler-32, and cyclic redundancy checks (CRCs).

The checksum may be provided either in hardware or handled in software. For example, certain Wi-Fi chipsets may offer checksum hardware acceleration to improve performance, whereas other Wi-Fi chipsets may not provide checksum hardware to reduce cost. Currently, BSD stacks query the NIC in order to determine whether or not the NIC supports checksum.

As a brief aside, copying packet buffers from user space stack is a necessity when the application is not trusted. Specifically, the kernel-only can be validated, sanitized, and/or modified before handing the data to the driver. The extra copy is transactional overhead. Since the extra step of copying data cannot be avoided, various embodiments of the present disclosure seek to defray the transactional overhead with simultaneous data manipulations.

In one exemplary embodiment, the flow-switch could perform a checksum while copying user space data to kernel space. The so-called "copy-checksum" is presented to the user space protocol stack as a virtualized network port that provides e.g. hardware accelerated checksum offloading. While copy-checksum is slightly more computationally expensive than a copy-only; the combined copy-checksum is much cheaper than existing software based checksums which perform the copy and checksum separately. Specifically, existing software based checksum logic is performed separately from the copy so as to support different NICs (which may or may not support checksum in hardware). The separate copy and checksum operations suffer from extraneous access and context switch penalties.

FIG. 10 is a side-by-side comparison of two devices that are manufactured and/or ostensibly sold as the same product. As shown therein, the internal components may offer a particular functionality (e.g., checksum function) or may not. For example, device 1000 illustrates a device that includes checksum functionality and is in data communication with a modem without hardware checksum function 1014. On the other hand, device 1020 illustrates another device that does not include checksum functionality and is in data communication with a modem with hardware checksum function 1034. As long as the devices made of these components are able to offer a same cumulative level of functionality, the different combinations of constituent components may vary in their functionalities.

During operation, the software determines what hardware functionality is supported, and responsively enables or disables a particular functionality (e.g., checksum function). If the particular functionality is not supported by the hardware, the software needs to enable the functionality so that the device operates properly. On the other hand, if the particular functionality is supported by the hardware, the software may disable the functionality and free up resources for other purposes. In this way, the availability of hardware offload as recognized by the software, may allow a particular functionality to be either enabled or disabled in the software. When the software is able to determine that a particular functionality may be disabled in the software, it may free up resources to allow more efficient use of the resources.

For example, when an existing device 1000 includes a modem without hardware checksum function 1014, the existing device 1000 enables a checksum function 1010 in a kernel space of the system. In this example, a packet of data travels from an application 1002 of user space to kernel space via socket 1004. After parsing of the packet by the TCP/IP stack 1006/1008, the packet is processed further by the checksum component 1010. After the additional parsing done by the checksum component 1010 is completed, the packet is then routed via driver software 1012 to the modem without hardware checksum function 1014.

On the other hand, when an existing device 1020 uses a modem with hardware checksum function 1034, the existing device 1020 disables the checksum function in the kernel space of the system. In this example, a packet of data travels from an application 1022 of user space to kernel space via socket 1024. After parsing of the packet by the TCP/IP stack 1026/1028, the packet simply passes through to the driver software 1032. Then, the driver software 1032 routes the packet to the modem (which performs the checksum function 1034 in hardware).

Notably, software based checksum suffers from substantial performance penalties. First, the kernel must copy the entire word to memory in order to ensure that the checksum operation cannot be tampered with (checksums in user space cannot be trusted). A software based checksum function requires reading each word from memory for calculation and accumulation of a checksum value. Consequently, the software based checksum in kernel space pays an additional penalty of parsing of the copied data to implement the checksum function. In other words, existing BSD software checksums must be performed on data that's already been copied once.

Figure 11:
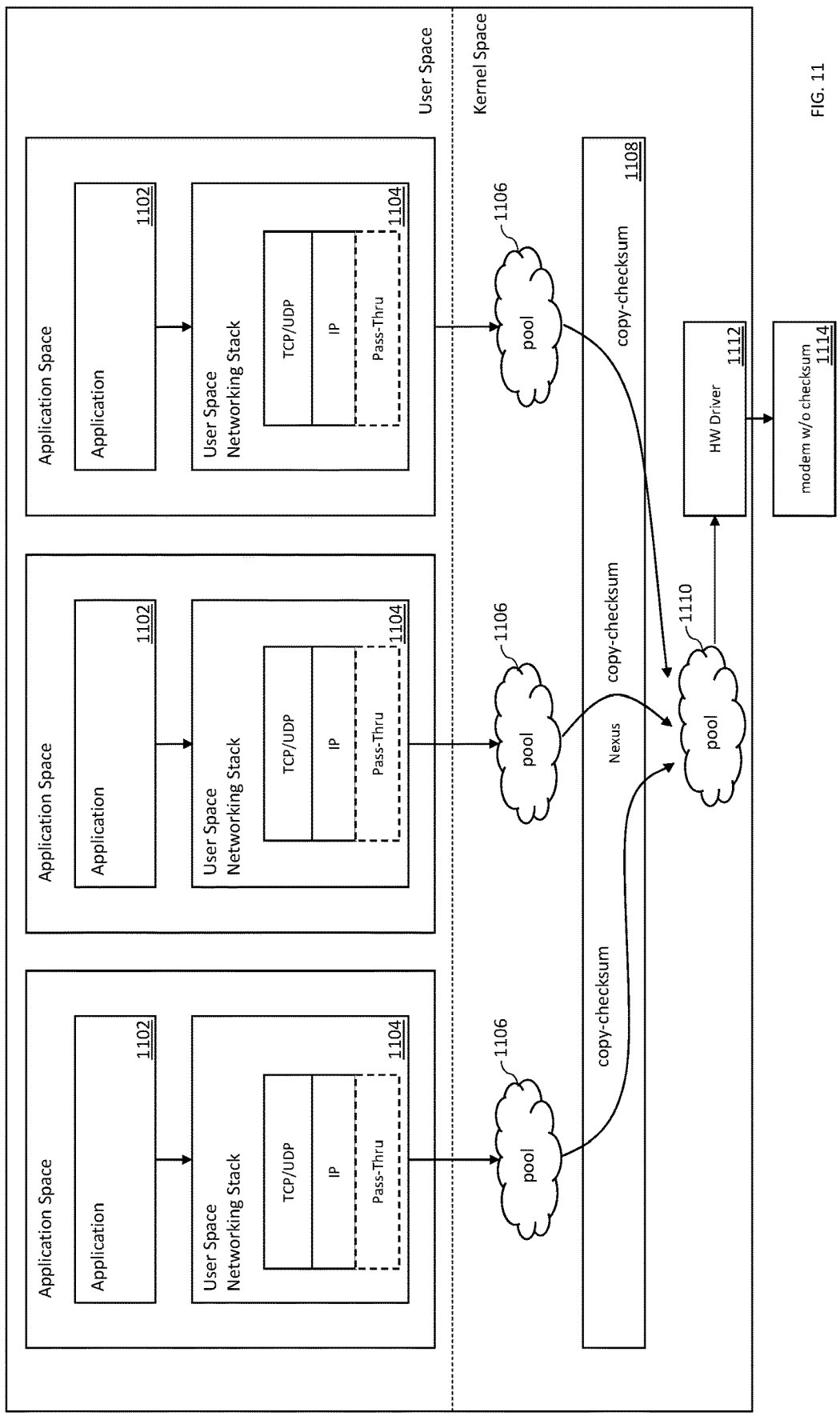

FIG. 11 is a logical block diagram of one exemplary user networking device providing copy-checksum optimizations.

As shown therein, each application 1102 is instantiated in its own application space within the user space of the system. The disclosed instances are purely illustrative, and artisans of ordinary skill in the related arts will readily appreciate that any number of applications requiring network communication may be instantiated with various entities that are not illustrated in this drawing.

The application space includes one or more user space networking stacks 1104 that provide networking functionality. Each user space application 1102 is in data communication with its own instance of a user space networking stack 1104. In the illustrated embodiments, the user space network stack 1104 processes at least TCP/UDP/IP packaging. As described herein, the checksum function may be disabled (as if it were to be implemented by a different component in the system e.g., hardware offload) and handled as part of a copy-checksum operation. Copy-checksum occurs in both directions (transmission and reception). During transmission (the illustrated embodiment) checksum is computed while copying the packet from the user's packet pool to the driver's packet pool, this computed checksum is inserted in the packet's protocol header. In the receive direction (not shown), checksum is computed while copying the packet from the driver's packet pool to the user's packet pool, the computed checksum is then placed in the packet metadata. The user space TCP/IP stack uses the computed checksum in the packet metadata to verify the checksum from the protocol header of the received packet and rejects the packets if the verification fails. Artisans of ordinary skill in the related arts will appreciate that other implementations may perform the copy-checksum when moving user space data (generated by stack 1104) to the user packet pool 1106 or from the driver 1112 to the driver pool 1110.

Notably, the virtual network port appears to provide the benefits of "hardware-based" checksum acceleration even though the copy-checksum is performed in software. Additionally, the user space application 1102 and/or user space networking stack 1104 will experience actual performance improvements from the checksum offload (the processing load has not merely been shifted to a different software process). Specifically, the TCP/IP packets from user space networking stack 1104 are stored in a memory pool 1106, and copied from the user space packet pool 1106 to the driver packet pool 1110 in a word-wise copy-checksum operation by nexus 1108. Unlike a bulk data copy (e.g., copying packets of data from user packet pool to the driver packet pool) that separately calculates the checksum, the word size copy-checksum operation allows the system to do the checksum as part of the copy (entirely obviating the aforementioned access penalty).

More directly, the copy-checksum operation is both a copy operation and a checksum function. While this is more expensive than a traditional copy, it is less expensive than copying the entire packet as bulk data, and then retrieving each word of the packet data, updating the checksum, and storing back. The packet that has been processed by the copy-checksum operation is then copied into another pool of memory 1110 and then passed to the hardware driver 1112 so that it can be routed to the modem without checksum function 1114.

One advantage of the foregoing is that the user space networking stack always sees a hardware accelerated checksum. This simplifies user space networking stack operation. Because the user space networking stack always sees a hardware accelerated checksum, it does not need to implement a checksum function for itself. Furthermore, the user space networking stack of this embodiment may not need to run a check to see determine whether it needs to enable the checksum function. Also, the resulting data can be sent via commodity components that do not offer checksum functionality (which may be lower cost).

While the foregoing example is presented in the context of a data transmission, the various principles described herein may be used during data reception with equal success.

Methods—

Figure 12:
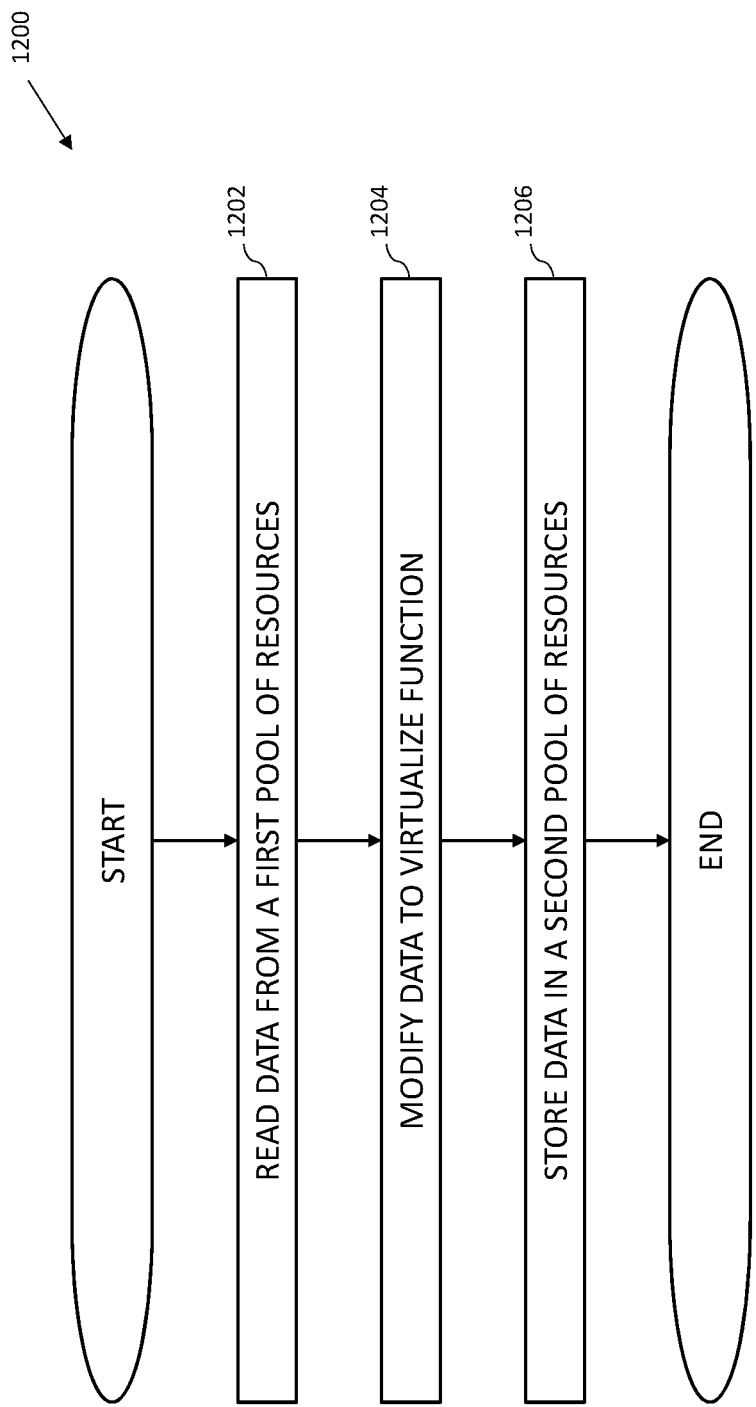

FIG. 12 is a logical flow diagram of one exemplary method 1200 for virtualizing hardware functionality in user space networking stacks.

As used herein, "virtualizing" refers to software emulation of platform operation and/or hardware functionality. For example, virtualization of a hardware checksum refers to software emulation of an equivalent checksum logic. As used herein, software refers to a sequential execution of one or more instructions stored within a non-transitory computer readable medium. More sophisticated software may be multi-threaded, parallelized, branching, and/or contextually switched, during sequential execution. Hardware refers to circuitry that performs logic by virtue of its physical construction; e.g., transistors, ADC, DAC, and/or other components. While the present disclosure is illustrated within the context of virtualization of a function in its entirety, artisans of ordinary skill in the related arts will appreciate that virtualization may also occur in part. For example, certain portions of functionality may be handled in software and/or the remaining portions in hardware (or vice versa).

Common examples of platform operation and/or hardware functionality include without limitation: data formatting (e.g., line coding, parity, checksum), control path signaling (e.g., re-timing, timestamp modification, translation, etc.), data modifications (e.g., scrambling, encryption, decryption, etc.). More generally, artisans of ordinary skill in the related arts will readily appreciate that a variety of different functionalities that are handled within dedicated hardware and/or firmware may be performed in-line during data transfers via a nexus, with equal success.

Virtualizing hardware functionalities enables pass-through functionalities in user space networking stacks. Pass-through functionality optimizes overall performance by avoiding unnecessary processing and/or appropriately prioritizing processing. For example, virtualization of hardware checksum offloading by flow-switch allows user space networking stacks to skip checksum processing in user space, even when the system includes a hardware that does not offer hardware checksum offloading. Additionally, rather than performing bulk copies and checksum operations in kernel space; the kernel can perform a word-wise copy-checksum to avoid access penalties. Notably, kernel space processes are also handled at a higher priority than user space processes; thus a kernel space copy-checksum prevents context switching and/or other interruptions (user space equivalents could be interrupted by higher priority kernel processes).

At step 1202 of the method 1200, a nexus reads data from a first pool of memory resources. In one exemplary embodiment, the first pool of memory is associated with a first application. In other embodiments, the first pool of memory may be associated with a driver and/or network interface.

Still other embodiments, may associate the first pool of memory with either a user space process or a kernel space process.

In one embodiment, the data includes packet data for transfer. Other examples of data may include without limitation: raw data for processing, encrypted data for decryption, etc. In another embodiment, the data is generated by an application. In other embodiments, the data is received, retrieved, forwarded, etc.

Common examples of data structures may include without limitation: tables, look-up-tables, arrays, two-dimensional arrays, hash tables, linked lists, records, databases, objects, etc. More generally, data structures are a collection of data values, metadata (data about the data) and/or their corresponding relationships and/or functions.

As used herein, the term "pool" refers to a collection of dedicated resources that are kept ready to use, rather than allocated for use and then released afterwards. While the present disclosure is directed to a "pool" based data transfers, artisans of ordinary skill in the related arts will appreciate that other mechanisms may be substituted with equivalent success. For example, other data transfers may use e.g., first-in-first-out buffers (FIFO), direct memory access (DMA), circular buffers, and/or any other data structure based mechanism. Still other data transfer mechanisms may incorporate logic and/or other signaling components. For example, data transfers may be based on registers, shift registers, and/or other physical components.

As a brief aside, a nexus is a logical entity that receives data streams from sources and/or generates data streams for delivery to destinations. Nexuses may perform a variety of different functions, including aggregation, division, combination, and/or other data stream processing techniques. In one exemplary embodiment, a nexus handles data flows of a specific technology. For example, a nexus (or flow switch) may handle network communications via TCP/UDP/IP. In other examples, a nexus may handle all inter-user space processes (e.g., upipes) and/or all user-kernel space pipes (e.g., kpipes).

In one exemplary embodiment, the user space application includes a user space networking stack. Each user space application creates an instance of a user space networking stack. Each user space networking stack includes a TCP/IP networking stack, which processes data for TCP/IP headers to be transmitted with the payload. Other examples of a networking stack include without limitation: HTTP stack, Ethernet stack, and IEEE 802.3u stack, which may reside in a kernel space. As used herein, a networking stack refers to a software implementation of a computer networking protocol suite or protocol family. A networking stack processes data so that it can communicated between two entities within a network at various different layers. Examples of network protocols include without limitation: HTTP, TCP, IP, Ethernet, and IEEE 802.3u, and examples of layers include without limitation: application layer, transport layer, network layer, link layer, and physical layer.

In another embodiment, the first application is a hardware driver application receiving data for a user space application. Common examples of a hardware driver include without limitation: network interface cards (NICs), Wi-Fi NICs, Bluetooth drivers, USB drivers, and/or other wired peripherals. Each driver allows data communication between different systems of software and/or hardware. As used herein, the term "driver" refers to an interface device that can be accessed by software to interact with a piece of hardware in carrying out a functionality.

At step 1204 of the method 1200, the read data is modified in accordance with a virtualized function. In one exemplary embodiment, network data may require a checksum to maintain data integrity. In one exemplary embodiment, checksums are word-based; thus, the flow-switch may read the data one word at a time from the first pool of memory resources. Each word of data is summed with a running value. In the transmit direction, the computed checksum is inserted into the protocol headers; in the receive direction, the computed checksum is attached to the metadata for the user-space stack to validate against the checksum received in the protocol header. Checksum data can be used by the recipient of the data to verify that all the data was properly received (i.e., the recipient should be able to calculate a matching checksum value). The foregoing word-based checksum is purely illustrative; different formats may perform checksums on a byte basis, block basis, and/or any other data size increment.

More generally, many forms of forward error correction, error recovery, and/or error detection require running calculations on the data stream. For example, cyclic redundancy checks use a running result from a polynomial shift register to provide a check value. Parity bits are often generated by counting a number of ones (or zeros) in a data stream. Other common forms of error correction include e.g., Turbo coding, Viterbi coding, interleaving/de-interleaving, Reed-Solomon encoding, etc. Artisans of ordinary skill in the related arts, given the contents of the present disclosure, may substitute any number of error detection/correction techniques with equivalent success.

Another common example of data modification is line coding. For example, 8B10B line coding converts 8-bits of digital data to 10-bits of line coded data for transmission over physical media. The 8B10B word provides several benefits (e.g., improved error recovery and noise immunity over physical media). Other examples of line coding include e.g., 32B/33B, 64B/66B, 128B/130B, Transition Minimized Differential Signaling (TMDS), Non-return to Zero (NRZ), Manchester encoding, etc.

In other such examples, audio and/or video data may intersperse certain control signaling within the data path; for example, many video formats require e.g., blanking interval insertion, clock recovery data, and/or other control information. More generally, artisans of ordinary skill in the related arts will readily appreciate that the data being read may be modified in a manner so as to assist, in whole or part, driver logic and/or hardware functionality.

While the present discussion is presented in the context of software operation, hardware accelerators may be substituted with equal success. For example, a DMA type component may enable copy-checksum transfer. Examples of DMA type components include without limitation: disk drive controllers, graphic cards, network cards, sound cards, etc.

At step 1206 of the method 1200, the data is stored in a second pool of resources by the flow-switch. The stored data can then be read from the second pool by a second application.

In one exemplary embodiment, the second application is a user space application transmitting data via a HW driver. In another exemplary embodiment, the second application is a HW driver application receiving data for a user space application.

In yet another exemplary embodiment, the driver application interfaces with hardware. In one variant, the hardware may be a commodity component that does not have the aforementioned functionality. For example, as a commodity component, the hardware may not have the aforementioned functionality and must rely on the virtualization of the functionality by the flow-switch or on the functionality as implemented by and enabled on e.g., the user space networking stack. In other variants, the hardware may include the functionality, but be allowed to operate in a disabled mode. For example, a modem as described herein may be capable of the aforementioned checksum offloading. However, the hardware may still operate with the checksum offloading disabled and rely on the virtualized checksum functionality as implemented in the system as described herein. The disabled mode allows avoidance of unnecessary use of resources and thus more efficient mode of operation.

Still other implementations will be made apparent to those of ordinary skill given the contents of the present disclosure.

Improvements and Changes to Memory Handling

The following discussion is directed to the salient distinctions in user space memory management that substantially improves and/or enables the foregoing discussions regarding the aforementioned exemplary channel input/output (I/O), as well as the user space networking stacks. More directly, as is discussed in greater detail hereinafter, the various aforementioned methods and techniques are substantially improved when considered in combination with novel memory architectures.

As a brief aside, traditional networking stack architectures were designed for server based applications; consequently, traditional stack architectures were expected to scale quickly to accommodate many network connections, in an environment where memory was not a primary consideration. Thus, the existing network stack implementations are not optimized for memory constrained platforms, such as consumer devices (e.g., MacBook®, iMac®, iPad®, and iPhone®, manufactured by the Assignee hereof). For example, as discussed in greater detail hereinafter, traditional stack architectures could be overly conservative by buffering too many packets and/or be not aggressive enough in pruning idle and/or stranded memory.

For example, consider a traditional network stack that e.g., browses to a webpage and attempts to open network sockets for each of the webpage assets. Initially, the traditional network stack will open as many network sockets as it can, in parallel, under the assumption that the network connection is the primary performance bottleneck. Moreover, the aforementioned "mbufs" (memory buffers) are allocated to the maximum amount of memory space, as a conservative hedge. Empirical evidence shows that the excessive number of mbufs that are created and wasted based on the network socket instances results in overall memory pressure on the system, thereby significantly affecting overall device performance. In other words, the open sockets with an excessively conservative memory allocation, opened in parallel, consumes too much of the overall system memory.

In contrast, exemplary embodiments of the present disclosure significantly improve device operation by implementing stringent memory limitations and relying on user space memory management techniques. For example, rather than opening multiple network sockets for each webpage asset, the user space network stack will only open a single channel resource and internally juggle the memory allocation for downloading the assets. More directly, each of the user space networking stacks is constrained to a fixed memory allocation for its channel. For example, each channel is limited to a few megabytes (MB) of memory. Unlike kernel space which can scale memory to support all of its user threads, memory management techniques for each user space applications are designed to frugally prune unused memory to stay within its own memory allocation.

Furthermore, traditional networking stack architectures suffer from buffer fragmentation that is directly attributable to the aforementioned mbuf divide/copy/move operations. As previously noted, a page of memory is divided into mbufs. Packets should ideally be stored in contiguous mbufs, however as packets are constantly added, removed, and/or changed in size, the contiguous memory space is consumed, leaving only small holes in which to place new data. As new packets are added and/or deleted, the memory necessarily becomes fragmented into non-contiguous data blocks. Unfortunately, reclaiming a memory page requires that every mbuf of the page is deallocated.

In contrast, exemplary embodiments of the present disclosure significantly improve device operation because channel allocations are contiguously assigned for a user space application (e.g., the user space network stack), and reaped back in its entirety. Consequently, the user space memory allocation and deallocation process inherently prevents persistent fragments of memory allocation. Thus, user space networking architectures do not suffer from performance loss due to memory fragmentation.

The following discussions present additional optimizations made possible by user space memory management which can be leveraged to further improve user space networking stacks functionality.

Channel Defunct ("Reaping")

In the following discussions, the exemplary kernel allocates memory chunks in so-called "regions"; each region is further subdivided into "segments"; each segment is divided into objects. The collection of regions for an exemplary channel I/O is called an "arena." More directly, each of the exemplary channel I/O has its own arena. While the following discussion is presented within the context of a particular memory allocation scheme, artisans of ordinary skill in the related arts will readily appreciate that other schemes may be substituted with equivalent success.

Within this hierarchical memory structure, each of the substituent tiered memory allocations are traversed for access, allocation, and/or deallocation. For example, if a process requests an object, then the kernel allocates a region, segment, and object, before returning an object to the process. Similarly, in order to free a segment, all of the objects of the segment must be freed. In order to free a region, all of its segments must be freed.

During normal operation, there are certain circumstances where a user space application is suspended or otherwise sent into an inactive state. Within the context of the aforementioned user space memory management cleanup, a backgrounded application is usually given some amount of time in which to "gracefully" exit or resume; thereafter, the kernel will attempt to free the underlying memory allocation. This can pose significant issues for user space networking stacks which may be operating within shared memory space, and which may still hold references onto its allocated data objects. In particular, if the networking process was backgrounded and the kernel frees its objects (the kernel will forcibly free the memory objects), then the user space networking stack may not correctly recover.

Traditional networking stacks are managed directly by the kernel, and thus are not subject to these cross domain hazards and/or have kernel based solutions for recovery (e.g., the kernel closes the in-kernel stack process, and notifies the application via the socket (the user space application would close out the socket)).

In contrast, exemplary embodiments of the kernel marks the channel allocation as "defunct". In one such implementation, the defunct arena of the channel is mapped to an anonymous (zero-filled) memory page (or other similarly recognizable invalid content). Thereafter, the kernel frees its underlying memory structures. When the task is resumed, the user space networking application will attempt to access the same channel using the redirected memory map, the access will succeed but will yield all-zero data. The subsystem in user space will then detect that the channel is defunct, and inform the user space stack layer about it. The user space application detects the invalid content and gracefully handles the errors. For example, the user space networking stack may close out the network connection and/or terminate itself.

As used herein, the term "redirect" refers to a memory mapping that is dereferenced to a memory location. The memory location may be a valid or an invalid memory region.

In other words:

Freeing networking memory associated with a process when it is backgrounded. When using a shared memory interface defuncting the memory gets very challenging as the process may be in the middle of a logic working on the shared memory data when it is backgrounded.

One solution redirects the shared memory mapping of the task so that they are backed with anonymous (zero-filled) pages and frees the underlying memory. When the task is resumed, the user space shared memory accessor functions (Libsyscall wrappers) have the logic to detect defuncted state of the shared memory and gracefully handle errors due to data inconsistencies.

Reaping Based on Heuristics

In-kernel network stacks juggle many different threads simultaneously for the entire system, each having different levels of priority. As a result, historically, it has been unfeasible to identify particular threads which are idle or underutilized in a traditional network stack. As a result in-kernel resource management "inline in data path" is prone to lock ordering issues and/or holding expensive exclusive locks.

In contrast, a user space network stack only services a single thread, thus a user space networking stack can easily identify if its resources are being squandered. Moreover, even where the user space networking stack incorrectly reaps its resources, the resulting performance loss is isolated to itself; it will not affect other stacks or drivers.

In one exemplary embodiment, a user networking stack monitors a number of parameters and/or other heuristics to determine whether or not the connection is idle. Common examples of such heuristics may include time alive, time waiting, buffering data, last time active, historic use, predicted use, and/or any other predictive or probabilistic scheme to identify when to reap a process.

It is appreciated that aggressive reaping methods may be used to improve performance up to a point, thereafter overly aggressive reaping may be detrimental. More directly, from a holistic system view, each of the user space networking stacks is associated with its own unique memory pools per channel and/or per device driver. Each of which has different performance requirements. For example, a cellular driver and an Ethernet driver has different requirements and/or costs of loss (e.g., Ethernet typically has higher runtime data rates, and thus a larger memory pool). Consequently, the aggressiveness or conservativeness of process reaping may be fine-tuned based on the type of application or driver and/or other application specific criteria.

In other words:

Efficiently and aggressively pruning and purging of idle resources is needed. Managing resources inline in data path may also be prone to lock ordering issues or holding expensive exclusive locks.

Various disclosed embodiments include mechanisms which can detect idle resources and can offload pruning and purging of these resources in a deferred context.

Daemon Specific Considerations

As used herein, the term "daemon" refers to a special process that runs within user space, just like other user space applications. However, daemons run in the background and do not require any user interaction at all. Moreover, $3^{rd}$ party developers also do not have control and cannot create system daemons. Only the Assignee hereof can create daemons for its own systems; they are a special, privileged type of processes that $3^{rd}$ party developers cannot deploy. Daemons are never suspended, and are usually limited to a fixed memory allocation.

Under some circumstances, a networking daemon can accidentally leak memory or cause other problems. For reasons previously articulated above, identifying rogue threads in traditional networking stacks was unfeasible. However, within the context of the present disclosure, assigning networking daemons to their own "user" space networking stack (even though the daemon is not really a user process) can greatly mitigate daemon errors and improve daemon recovery, provided that the daemon's networking stack is appropriately handled.

In one exemplary embodiment, in order to ensure that a daemon is correctly operating, the kernel sets a "high water mark" for the network daemon's thread (an amount of data that a daemon cannot exceed during normal usage.) Subsequently, if the daemon's thread leaks memory, the process can be terminated and/or restarted.

Unfortunately, a simple "high water mark" can still pose problems for networking daemons. In particular, networking daemon processes may be infrequent and generally operate on TCP. TCP holds onto packet buffers until the application (here, the daemon) is ready to consume the packets. Consequently, if the network daemon does not read data for long periods of time (which is relatively common for a network daemon), or if the network sends a large batch of packets (e.g., due to bad network conditions where TCP segments arrive out-of-order; TCP stores the already-received segments in its reassembly queue until the missing segments arrive), then the TCP flow could be associated with a large amount of memory. The TCP protocol in this case runs within the daemon, the memory associated with the TCP flow increases the physical memory footprint of the daemon. This increased physical memory footprint could exceed a daemon's allowable high water mark. Consequently, the daemon could be unintentionally targeted by the system for termination.

To these ends, various embodiments of the networking daemon stack include an efficient memory management module that keeps track of the memory consumed by the network protocols (e.g., TCP buffering) associated with the daemon. Depending on memory usage, the memory management module indicates to the kernel whether there is active work performed by the protocols on behalf of the application. Specifically, if the memory usage increases a certain threshold set by the memory management module, then the module indicates to the kernel that active work is being performed by the network protocols on behalf of the application. This lets the kernel know that the increased memory usage by the daemon is expected. Once the memory associated with the buffers are returned to the memory management module, the module indicates to the system that the active work is complete. This prevents the system from targeting processes that consume more memory while doing active work.

More generally, while the foregoing process is described within the context of a network daemon, artisans of ordinary skill in the related arts will readily appreciate, given the contents of the present disclosure, that substantially similar techniques could be used on other applications (e.g., slow responding or infrequent) and/or other protocols with longer queuing intervals.

In other words:

The TCP protocol maintains a sequence in packets and provides the data to the application in that order. So, TCP holds onto received packets, in cases where packets are received out of order or until the application is ready to read. If the application does not read data for long or if the network sends a large batch of packets, the TCP flow could be holding onto a large amount of memory for a while. This leads to increased physical memory footprint for a process and the process could be targeted by the system for termination.

In one embodiment, an efficient memory management module keeps track of the memory consumed by the network protocols and depending on memory usage indicates to the system that active work is being performed by the protocols on behalf of the application. Once the buffers are returned to the memory management module, the module indicates to the system that the active work is complete. This prevents the system from targeting processes that consume more memory while doing active work.

Other TCP Specific Considerations

TCP presents specific problems for traditional "defunct" Channel I/O (see e.g., Channel Defunct ("Reaping")). As a brief aside, during normal TCP operation, TCP packets are received and re-ordered. Thereafter, the TCP packet headers are checked in order to ensure that the re-ordered TCP packets are correctly received.

In other words, since the TCP headers are stored in the channel space, defuncting a channel I/O may result in data inconsistencies (and/or unknown states) in the TCP check logic (due to the memory mapping redirection to zero-filled pages); instead of triggering a graceful termination, the user space networking stack could trigger retransmission attempts or other undesirable data handling.

In one exemplary embodiment, in order to avoid data inconsistency issues when a channel is defunct during processing of TCP packet, the user space networking stack copies the original TCP header into heap memory (which is not part of the channel allocation). Once TCP processing begins, the user networking stack can use the copy of the TCP header to make decisions (thereby preventing undesirable behavior).

Additionally, in some cases, various embodiments also prevent data corruption to higher layers above TCP. For example, if the data contains zeroes due to memory redirection, then the data is not forwarded on. Instead, after the copy step (from channel buffer to application buffer), user space TCP checks to see if the channel is defunct and if so indicates that the connection is disconnected (so that data can be thrown away).

More generally, while the foregoing process is described within the context of TCP, artisans of ordinary skill in the related arts will readily appreciate, given the contents of the present disclosure, that substantially similar techniques could be used on any dedicated logic (which would not recognize the aforementioned invalid data).

In other words:

Using the channel memory after defunct could lead data inconsistencies in user space TCP.

To avoid data inconsistency issues when a channel is defunct during processing of TCP packet, various embodiments make a shadow copy of the original TCP header in heap memory. Once TCP processing begins, it uses the copy of the TCP header to make decisions which prevents any inconsistency or data corruption. The validation is done prior to handing off the payload data to the layer above TCP, as well as within the TCP input processing paths.

Flow Manager

Unlike traditional networking stacks which only support a single protocol stack instance, the user space networking stacks each support separate instances of a protocol stack. Each stack is further associated with a set of flows. Thus, as user stack instances are created and destroyed, there is a corresponding need to manage flow life-cycles within the nexus.

In one exemplary embodiment, the nexus includes a flow manager that couples to multiple communication stacks in order to manage flow life-cycles. In one such embodiment, the flow manager is a logical entity that accepts calls to create, destroy, defunct, and/or otherwise manipulate flows. In some variants, the flow manager may also automatically shut down flows when the flow owner process exits.

As previously noted, the nexus may interact with both non-kernel and in-kernel networking stacks to e.g., enable legacy stack operation and/or other daemon based networking stacks. For example, the flow manager may interoperate with both legacy sockets as well as user space network extensions. Moreover, it is further appreciated that applications that reference higher layer APIs may not know whether it is best served by a socket, network extension or other protocol stack instance. Selection of the appropriate protocol stack be managed by the libnetcore (e.g., either a socket to a legacy stack or a network extension to a user space networking stack, etc.)

In one exemplary embodiment, the flow manager works with the Network Extension Control Policy (NECP) module that interfaces with the user space network stack (which resides within a larger library for network interfaces (libnetcore)). For example, a higher API call to libnetcore, will communicate with the NECP, which communicates with the flow manager to obtain a flow for e.g., a socket or user space networking stack instance.

In other words: There is a need to manage flow lifecycles e.g. flow creation and destruction at the flow-switch, which interfaces with calls/events from other components.

Flow manager is the entity that provides the interface. The flow manager accepts calls to create/destroy/defunct flows. It also shuts down flows when the flow owner process exits. This allows proper clean-ups to be done regardless of how the process terminates.

Flow Purging, and Defuncting

As a brief aside, in traditional networking stack technologies, every connection is associated with a socket (a socket is file descriptor). Thus, each socket is independent of other sockets. For example, if a traditional networking stack has a number of existing sockets and tries (but fails) to open another socket, the existing sockets are unaffected. Additionally, the connection is directly tied to the socket (i.e., 1:1 mapping).

In contrast, various embodiments of the present disclosure are directed to channel I/O which is a single file descriptor that may encompass multiple flows (1:N mapping). Consequently, opening and closing a channel should be performed as a separate operation from opening and closing a flow. More directly, within the context of the kernel's purging/defuncting operations, each channel instance and flow entry object is separate and distinct, they have different life-cycles and can be purged and defuncted separately.

In some cases, user space TCP/IP stacks might keep flow registration entries active without diligently closing them; this results in the kernel holding onto the flow's associated data structures, even for dead flows (like a closed TCP flow).

In one exemplary embodiment of the present disclosure, a "flow tracker" passively updates flow states (via packet inspection, which monitors but does not affect the flow state.). In one such variant, the flow tracker tries to determine the state of the flow based on the packet sniffing the flow. If the flow tracker believes that the flow is dead, then the flow tracker can update the flow registration accordingly.

In one exemplary embodiment, the flow-switch actively (via a specific kernel thread for removing inactive flows) scans through all flows and finds dead flows to suspend. In one such variant, the flow-switch can read updated entries by the flow tracker. In other variants, the flow-switch may actively test one or more flows for suspension. In some variants, a daemon (assertiond) runs in the background to defunct flows when a process is suspended.

In other words:

User space TCP/IP stacks might be holding flow registration without diligently closing them, thus causing the kernel to keep data structures around, even for dead flows (like closed TCP flows).

In one embodiment, 1. The flow tracker passively updates flow state; 2. flow-switch actively scans through all flows and find those dead flows and close them; 3. orthogonally during defunct, assertiond calls in to defunct flows when process goes suspended.

Flow Control and Advisory

As previously noted, the unique shared memory of the channel I/O and flows (when compared to prior art 1:1 socket based solutions) requires different methods for bandwidth sharing. Consequently, in one exemplary embodiment of the present disclosure, the flow manager includes a mechanism to moderate flow control for each flow so as to efficiently use the overall channel for the user space networking stack.

In one such implementation, the user space network stack infrastructure provides a packet I/O mechanism to user space stack. Additionally, the packet I/O mechanism includes Active Queue Management (AQM) functionality for the flows associated with the user space network stack. AQM culls packets to ensure that each flow does not approach its maximum size (i.e., to prevent a single flow from dominating the shared network interface bandwidth). Moreover, since packet culling may require removing "good" packets, the AQM module trades off overall channel performance for each individual flow performance. In some cases, a flow may be decimated for the benefit of the channel, or conversely the overall channel efficiency may be reduced to benefit a flow.

As a related aspect, the unique shared memory of the channel I/O and flows also requires different schemes for efficiently providing flow advisory feedback to user space stacks. More directly, the various advisory information for the flows of the channel are separate from the channel's overall performance.

As noted above, the user space network stack infrastructure may support a packet I/O mechanism that includes Active Queue Management (AQM) functionality for the flows associated with the user space network stack. In one such variant, the AQM functionality in the user space network stack utilizes a kernel event mechanism with a specific type to perform flow advisory reporting (e.g., that a flow has started, stopped, etc.)

As a brief aside, a flow advisory on a connection is received from AQM when one of the following two conditions is true: 1. the send rate of a TCP connection increases above the bandwidth supported on the link, or 2. the available bandwidth on a wireless link, which is the first hop, from the device goes down.

As a brief aside, flow advisory conditions present problems because sending more packets will accumulate packets in the interface queue and will increase the latency experienced by the application. Otherwise, it might cause packet drops which will reduce the performance because the TCP sender will have to retransmit those packets. By using the flow-advisory mechanism, the TCP senders can adapt to the bandwidth available without seeing any packet loss or any loss of performance. The interface queue will never drop a TCP packet but it will only send a flow advisory to the connection. Because of this mechanism, buffering in device drivers was reduced by a significant amount resulting in improved latency for all TCP connections on the device.

In other words:

In a user space TCP/IP stack architecture, the stack instance and the network driver are operating in different domains (user space & kernel space). An efficient mechanism is needed for the user space stack to determine the admissibility state of a given flow in the stack instance.

In one embodiment, user space network stack infrastructure channels provide a flow advisory table in shared memory which is updated by the kernel and consulted by the user space stack to flow control a given flow. In essence, this table provides admission control information to the user space stack.

In a user space TCP/IP stack architecture, the stack instance and the network driver are operating in different domains (user space & kernel space). An efficient mechanism is needed to signal the user space stack from kernel space to "flow control" or "resume" a given flow in the stack instance.

In one embodiment, user space network stack infrastructure channels utilize kernel event mechanism with a specific type to indicate the user space stack about any updates to the flow advisory state in kernel which is reflected in the "flow advisory table" maintained in shared memory. Each row in the table represents information about the flow, as well as the advisory state (e.g. flow-controlled, etc.)

User Space Networking Stack AQM Optimizations

Existing implementations of AQM enable the network to provide AQM flow control and advisory information to the in-kernel stack. However, under the traditional networking paradigm, the in-kernel stack is unaware of the applications associated with the data. In contrast, AQM flow control and advisory information may be further tailored and improve user space networking stacks because the user space network can quickly identify which flows should be culled (or preserved) on the basis of application considerations.

In one exemplary embodiment, the user space networking stack can implement AQM to prevent buffer bloat conditions intelligently based on which flows should be preserved and/or which flows can be culled. More directly, by intelligently selecting AQM culling based on application considerations, the user space networking stack can achieve the benefits of both AQM as well as flow priorities.

Moreover, AQM in the uplink direction can also be improved. In some embodiments, the user space network stack can further tailor flow control and advisory before transmission by checking if the flow is admissible on the channel prior to the transport layer generating packets.

In one embodiment, legacy AQM functionality is preserved for both user space networking stacks and in-kernel stacks. In one such implementation, the in-kernel stack can get synchronous flow advisory feedback in context of the send/write operation.

In other words:

A common AQM (Active Queue Management) functionality for a network interface hosting multiple and differing stack instances (user space protocol stack and in-kernel protocol stack) is desired. The in-kernel BSD stack uses mbuf packets whereas the user space stack instance uses user space network stack infrastructure packets. The flow control and advisory feedback mechanism also differ for these stacks due to their placement.

In one variant, the user space network stack infrastructure flow-switch nexus is a common entry point for the in-kernel BSD stack and the user space stack. The flow-switch nexus handles the different packet descriptor schemes and converts them to the packet descriptor scheme being used by the underlying network driver before storing the packets to the AQM queues. It also implements the appropriate mechanisms to provide flow control and advisory feedback from the AQM queues to the different stack instances.

Driver Managed Pool Resources

As used herein, "wired" memory refers to memory allocations that are backed by actual physical memory; in contrast, "purgeable" memory refers to memory allocations that may be either actually present or virtually present (virtually present memory can be recalled from a larger backing memory, with a cache lookup penalty). Notably, the aforementioned mbufs for traditional in-kernel operation are wired memory; however, the memory allocations for channel I/O disclosed in the various described embodiments are generally purgeable.

In some cases, a device driver may require a pool of packet buffers to support direct memory access (DMA). In one exemplary embodiment, in order to support DMA within the shared purgeable memory, the driver dynamically maps into the Input/Output Memory Management Unit (IOMMU) or DMA Address Relocation Table (DART) aperture. In some variants, the driver managed pool of resources can be controlled by the driver (e.g., not by the user or kernel process). Various embodiments may further allow the pool to be exclusive to the driver, or shared among several drivers. Read and write attributes can also be restricted on both the host and the device side based on the I/O direction.

In other words:

A system global packet buffer pool is suboptimal in terms of resource allocation, and does not offer the ability to deploy device/driver specific security policies.

In one exemplary embodiment, a packet buffer pool managed and owned by a driver that can be dedicated for that driver, or shared among several drivers is disclosed. The owner of the pool handles notifications to dynamically map and unmap the pool's memory from its device IOMMU aperture. This same notification can also wire/un-wire the memory as needed. Read and write attributes can also be restricted on both the host and the device side based on the I/O transfer direction for added security.

Segment-Based IOMMU/DART Mapping Considerations

As previously noted a channel is associated with an arena, that is composed of regions, which are further composed of segments. One of the aforementioned benefits of the purgeable memory hierarchy within the context of the user space networking stack, is that portions of the memory can be dynamically freed and/or allocated throughout the duration of the stack.

However, certain device drivers require that their memory is wired on demand e.g., the system memory shared with the hardware device may need to be wired during an I/O operation. Consequently, various embodiments of the present disclosure can wire down and I/O map a memory segment within the shared channel space. Since looking up the I/O bus address through an Input/Output Memory Management Unit (IOMMU) or DMA Address Relocation Table (DART) is not cheap, mapping a memory segment also has the benefit of being able to quickly derive the I/O bus address for all the packet buffers within that memory segment based on the single memory segment lookup.

In one such implementation, the request to map the memory segment using the memory management unit (IOMMU, DART, etc.), triggered by a constructor/destructor call back from the memory segment, can be extended and overridden by each driver via object-oriented subclassing to implement driver specific behavior.

In other words:

A packet buffer is typically smaller than a page size but the IOMMU requires mappings that are multiples of a page size. Looking up an I/O bus address can also be expensive.

Within the packet pool, use a memory segment which is guaranteed to be a multiple of a page size as the smallest memory unit for I/O mappings. Each memory segment is then divided into several packet buffers. Only one I/O bus address lookup is required for all the packet buffers within that segment, and this I/O bus address can also be cached within the segment object.

User Packet Pool

Traditional in-kernel networking stacks are unaware of user space application requirements, and thus always allocate as much memory as possible (to accommodate the worst case scenario). However, as previously noted, user space networking stacks can be far more aggressive, and dynamically allocate memory (and/or free memory) on an as needed basis.

Unfortunately, dynamically allocated memory can introduce other potential issues. For example, whenever the user application asks for a new memory allocation via a system call, the kernel returns the memory allocation. This cross domain transition can result in the aforementioned performance issues (due to context switching, etc.). More directly, dynamically allocated memory schemes introduce cross domain system calls that must be moderated to enable each process to achieve the maximum possible throughput.

An efficient scheme should dynamically scale up and down the memory available to each process according to the current throughput requirements. In one such exemplary embodiment, the user packet pool uses an efficient packet I/O mechanism to move memory buffers across kernel-user boundary and utilizes channel sync statistics to dynamically scale the amount of memory available to each channel.

In one such implementation, dynamic memory allocations are performed via a set of rings. A first "alloc" ring is used to store packet requests, a second "free" ring is used to store memory allocations that should be freed. During operation, the user space stack requests to allocate some packets via a single call, and the kernel in turn does the actual object allocations and attaches the objects to the alloc ring. Then when the user space stack is done with the objects, it attaches them to the free ring, and notifies the kernel via a single call. In turn, the kernel will free each object that is returned via the free ring.

By using a ring based transfer mechanism, the user and kernel process can "batch" multiple allocation and deallocation operations together (e.g., at packet transfers); more directly, this allows the kernel to amortize system call cost over a time (e.g., packet calls).

In other words:

When network stack processing is moved into a process context, it is a challenge to allocate enough memory efficiently to enable each process to be able to achieve the maximum possible throughput.

In one embodiment, an efficient scheme is needed to be able to dynamically scale up and down the memory available to each process according to the current throughput requirements is disclosed. User packet pool is a mechanism to achieve this, it tries to reuse the efficient packet I/O mechanism to move memory buffers across kernel-user boundary and utilizes channel sync stats to dynamically scale the amount of memory available to each channel.

Dynamic Sizing for Flow-Switch Ports

As previously noted, the unique shared memory of the channel I/O and flows (when compared to prior art 1:1 socket based solutions) can be further leveraged to maximize flow-switch operation. As a brief aside, even though the channel I/O persists, each of the flow-switch ports can dynamically be created or removed. Thus, the flow-switch port can experience "fragmentation" effects over time. Even though these fragmentation effects disappear once the channel itself is closed, excessive fragmenting can impact the memory usage and lookup efficiency for the duration of the channel lifetime.

In one exemplary embodiment, the flow-switch breaks up port space into chunks and can manage flow-switch ports at a granularity; in this manner flow ports and their data structures can be grown and shrunk on demand. For example, consider a flow-switch with 100 ports allocated in 10 port chunks. If 95 ports are freed, only ports 91-100 need to be reserved (the rest can be freed).

In other words:

Flow-switch port come and go and could be fragmented over time (large holes with high port numbers open), without properly managing, this could use extra memory for book keeping.

In one embodiment, the flow-switch breaks up port space into small, contiguous chunks and manages ports at that granularity; data structures are grown and shrunk on demand. This allows us to provide sparse ports usage.

Further Enhancements and Optimizations

Metadata Red Zones

Contiguous or adjacent memory objects are prone to inadvertent memory corruption due to buffer overrun issues. In a shared memory architecture the ability for consumer of the data to detect these issues in the least expensive manner is important.

Various embodiments of the present disclosure include user space network stack infrastructure data descriptors (also known as packet or quantum) that have a metadata preamble placed at the beginning of the object. This metadata preamble is used to detect any inadvertent overwrite of the metadata. Each metadata object will have a unique red zone pattern which, in one such variant, is the XOR of a red zone cookie and the offset of the metadata object in the object's memory region. Red zone cookies are initialized with random numbers on an OS boot. In the event the kernel detects a corruption, the user space process associated with the channel is terminated to prevent further damages.

Object Validations and Sanitations

Using packet descriptor memory shared between user-space and kernel is prone many security vulnerabilities. An efficient method to validate and sanitize these objects during user to kernel handoff is needed.

In one such embodiment, a user space network stack infrastructure architecture maintains a mirrored copy of the packet descriptor memory which is accessible only from the kernel. During packet handoff from user-space to kernel, the user accessible descriptor is validated (against the kernel copy) for any semantic issues and the sanitized data is copied to the kernel mapped descriptor.

Nexus Port Binding to PID, Key Blob, Binary UUID

Access control on user space network stack infrastructure nexus ports is necessary to prevent unauthorized clients from opening channels.

In one such embodiment, an access control mechanism based on one or more attributes associated with a channel client, namely process ID, process executable's UUID, or key blob is used. A nexus provider chooses to select one or a combination of those attributes for securing access to a port of a named nexus instance.

SYNflood Detection and Mitigation; RSTflood Detection and Mitigation

Since TCP stack in user-space can be compromised by malicious actors running in the same address space, mechanisms to prevent SYN flood and RST flood attacks originating from the user space stack are needed. A flood attack is a form of denial-of-service attack in which an attacker sends a succession of (SYN/RST) requests to a target's system in an attempt to consume enough server resources to make the system unresponsive to legitimate traffic In one embodiment, user space network stack infrastructure flow-switch implements flow tracking logic which can detect SYN flood and RST flood to prevent these attacks originating from our device. If an attack is detected, the flow-switch will rate-limit the SYN and RST packets coming from the user space stack.

Split TX and RX Packet Pools (Direction Specific DMA Access for Security)

Buggy or hostile devices may use PCIe-mapped buffers to attack the host, such as by overwriting the content of in-use buffers, or performing timing/time-of-use based attacks.

To protect & mitigate these attack surfaces, embodiments of the user space network stack infrastructure setup map segments to use the minimum possible memory access permissions on receive and transmit packet buffers.

Randomized Memory Segment Sizes

Buggy or hostile devices may use PCIe-mapped buffers to attack the host.

To help mitigate this vulnerability, embodiments of the present disclosure randomize the PCIe address space mappings, to make it difficult for an attacker to find vulnerable host-side resources. To help support this security protection, variants of the user space network stack infrastructure randomize its segment size by randomizing the number of pages per segment at the time segments are allocated. The user space network stack infrastructure may also randomize packet order within a segment, to make it more difficult to correlate packet address to position within a segment. This could be done via a random slide when the segment is first split into packets. For instance, by randomly choosing which slice of the segment is the first packet, instead of always using index 0. Together, these protections make it difficult for an attacker to predict the segment start, end and position from a packet's address. This also makes it difficult for an attacker to predict the location of other segments.

TOCTOU Attack Mitigation

Networking devices such as Wi-Fi chip and baseband could be compromised. Such compromised firmware could launch attack against kernel on the application processor using DMA memory. Time of Check to Time of Use (TOCTOU) attacks are caused by changes in a system between the checking of a condition (such as a security credential) and the use of the results of that check. For example, a TOCTOU attack could change DMA'ed memory after the kernel has done the sanity check.

In one exemplary embodiment, the nexus makes a kernel only copy before accessing device supplied data to help mitigate this vulnerability, all subsequent sanity checks and uses on the data are carried out on the kernel only copy. So even if compromised device launches TOCTOU attack, the kernel sees and uses the consistent kernel-only copy that is not affected as such.

Entitlements to Access Stats and Nexus Operations

Unauthorized applications could infer user and/or application activities from unprotected user space network stack infrastructure stats, or perform unauthorized nexus operations (like opening a channel to NIC).

In one such embodiment, the system makes entitlements checks for privileged operations, so that these operations can be done only by processes possessing such entitlements e.g., trusted processes.

Leveraging RTT Estimation Data for Bounds Checking

Round Trip Delay Time (RTT) measurement is a critical value for TCP operations such as retransmission and fast recovery. Since TCP stacks are in user space, they can push down malicious RTT measurement for a particular route (e.g. to an extremely small value). The effect of this is that, based on this measurement, other TCP stacks could unnecessarily generate many retransmissions to that host. With many devices compromised as such, it could effectively launch a DoS (denial of service) attach against that host.

In one embodiment, the kernel also does its own rough RTT measurement using flow tracker in the flow-switch to mitigate RTT-type attacks. To accept measurements from user space, the kernel does a sanity check with its estimated upper and lower bounds. Only the RTT samples that pass the kernel sanity check may be published to other TCP stack instances.

Do Malicious Stats Detection Before Folding into Trusted Stats. Always Use Trusted Stats from Kernel for Critical Info (e.g. Cellular Usage)

Since TCP/IP stacks are in user space, they can push down malicious stats counters to fool kernel/other instances of TCP/IP stack. For instance, the user TCP could tell that it's using less packets/bytes when using cellular data, to get around the user visible cellular usage accounting.

In one embodiment, the nexus also instantiates a shadow kernel-only stats object in addition to the user space protocol stack instance shared stats object. The kernel-only stats object stores historical values of the user space protocol stack stats. Before accepting the user space protocol stack stats, the nexus derives delta of each uTCP stats snapshot with the historical value and does anomaly detection. Also for critical stats, such as cellular data usage, the user space network stack infrastructure only relies on trusted flow-switch kernel observed stats.

Preventing IP Address/Port Spoofing

Since TCP/IP stacks are in user space, they can generate packets that are not allowed from that particular TCP/IP instance, e.g. IP that doesn't belong to that host, ports that doesn't belong to that process.

In one embodiment, the flow-switch does a flow 5-tuple lookup in kernel with the registered flows before packets are transmitted to make sure the sender has the matching 5-tuple registration. Any packets with non-matching 5-tuple and various other metadata such as flow identification would be dropped.

Trusted TFO & ECN

TCP in the user space network protocol stack supports both TCP Fast Open (TFO) and Explicit Congestion Notification (ECN). Both TCP options are enabled and/or disabled based on per network heuristics maintained on the system. This is done to avoid using TFO and ECN on networks that either do not support these options or blacklist devices if the options are present in the TCP header.

During normal operation, the ECN and TFO heuristics are updated each time a TCP connection experiences a success or failure when using TFO or ECN. If a TCP connection does not experience issues when using these options, new TCP flows would continue to use these TCP options. So, if the heuristics is updated with incorrect data, it could lead TFO and ECN being enabled on networks that do not support these options.

Within the context of a user space network stack infrastructure, the TCP protocol stack runs in the user process's context. Each time a user space TCP connection experiences success or failure while using TFO or ECN, it makes a system call into the kernel to update the heuristics. So, a malicious app could indicate a TFO or ECN success on networks that do not support TFO or ECN by simply making a system call. This would result in new flows on the system incorrectly using TFO and ECN option which could lead to bad user experience or in worst case scenarios, blacklisting of devices.

All processes can indicate to the system heuristics a failure of TFO or ECN. But, in one exemplary embodiment, only processes that are trusted on the system can update the heuristics with TFO or ECN success. This prevents malicious apps from incorrectly updating TFO or ECN success on networks that do not support these options.

Multi-Buflet Descriptors (Array)

Existing systems allocate memory to hold the largest possible frame size, but jumbo frames need to be supported in a memory efficient manner.

In one embodiment, a packet can hold an array of buflets, each buflet points to a fixed size block of memory allocated from a pool. The binding between the buflets and a packet can be formed on demand. This scheme allows a packet to have a variable number of buflets depending on the size of the payload. This also makes it easier to support scatter-gather style DMA engines by handing it buflets, which are uniform by nature.

Split Metadata and Buffer Management

Exposing packet metadata to the hardware such as Wi-Fi chips and cellular baseband could lead to security vulnerabilities such as Return Oriented Programming and TOCTOU attacks.

In one exemplary embodiment, the system uses different memory regions for the packet metadata and the packet buffers to prevent malicious hardware from accessing the packet metadata. Only the packet buffers are I/O mapped and visible to the device.

User Pipe Dynamic Memory Management Using Sync Stats

Various embodiments of the user pipe nexus provide an efficient IPC between user space processes using shared memory. However, the number of processes using IPC on an iOS device can be significant. An efficient mechanism is needed to keep the shared memory usage to minimum without compromising on the data throughput.

In one embodiment, the system maintains a fair estimate of immediate memory usage of user (working set) depending on the recent past usage. User pipe nexus maintains a weighted moving average statistics of memory used during each sync and keeps adjusting the channel memory accordingly.

Purgeable Memory (Compressible and Swappable)

The networking memory requirement on an iOS device can be significant. Existing architectures needs all of the memory to be wired, which reduces the system's ability to recover under memory pressure as the memory cannot be swapped or compressed.

In one exemplary embodiment, the user space network stack infrastructure architecture allocates all memory as purgeable and wires memory on demand when needed.

Memory Region/Arena: Purpose, Layout, Access Protection, Sharing Model

An efficient and generic mechanism to represent and manage the shared memory objects of varying types and sizes which are memory mapped to the user space and/or kernel space is needed.

In one embodiment, the user space network stack infrastructure architecture uses shared memory for efficient packet I/O, network statistics and system attributes (sysctl). The user space network stack infrastructure arena is a generic and efficient mechanism to represent these various types of shared memory subsystems and their backing memory caches, regions and access protection attributes. Channel schema is a representation of the shared memory layout for user space process to be able to efficiently access various channel objects.

Mirrored Memory Regions

To implement security validation and sanitation of shared memory objects on the user-kernel boundary, kernel checks a kernel only copy of these objects. Improved methods for allocating and retrieving these objects are needed.

In one embodiment, the system creates mirrored memory objects which share the same region offset as that of the associated object and hence can be retrieved quickly from the attributes of the associated object.

Flow Classification

In one embodiment, the flow-switch parses various protocol layers in a classifier approach, e.g. IP/TCP/UDP all at once, when the packet is later on consumed by those protocol stack, they do a duplicate parsing of their header.

In one variant, the user space network stack infrastructure packets have a struct_flow as part of packet metadata which contains most information that those layers need and it is carried into BSD/user space, etc. The contents of this structure is filled once by the flow-switch, and is important for performance (the cost of parsing protocol headers is only paid once).

Flow Entries

A mechanism to facilitate efficient packet forwarding within a user space network stack infrastructure flow-switch is needed.

In one embodiment, packet forwarding based on the entries of a flow table allows the system to facilitate optimal forwarding data plane logic; in one such variant, multiple network interface nexus are fused together to form a direct conduit for sending packets to one another.

Flow Actions

Flow-switch flow needs to carry action on packets for a given flow.

In one embodiment, the flow defines possible actions that can be applied to its packet, e.g. forward to a flow-switch port to user space protocol stack, forward to BSD stack, drop, transform, etc. This allows for an efficient way to apply traffic rules without involving separate database lookups.

Flow Routes

ARPing/routing is still managed by BSD stack, user space network stack infrastructure flows need to consult BSD stack for information like default gateway MAC, etc., which incurs overhead per packet.

User space network stack infrastructure flow route is a cache around those BSD info, such that for user space network stack infrastructure flow packets can find those information within user space network stack infrastructure context along with flow lookup. The flow route is notified when related events happen, e.g. route change, ARP expire, to maintain consistency. The flow routes allow for packets going out of the system via User space network stack infrastructure channels to not incur per-packet routing table lookup costs.

Flow Tracker

With user space network stack infrastructure, TCP/IP protocol is in user space, so kernel loses knowledge of flows as compared to kernel TCP/IP protocol stack. Such knowledge could be useful to help kernel making decisions, e.g. scheduling, resource management, etc.

Flow-switch has a flow tracker that passively tracks flow state/stats during flow classification and classifier. It provides KPI for other component to query flow states and stats. It also takes some pro-active actions in cleaning up flows that are deemed to be terminated (by both ends) and not expecting any more data.

Achieving Low Latency for Urgent Packets Using Flow Tracking

Since we explicitly batch packet before delivering to NIC or user space, urgent packets like DNS queries/TCP control packets are unfavorably delayed.

The flow tracker checks for those packets and do a flush/notify when seeing them to ensure we deliver them with low latency. This allows it to dynamically adjust the notifications posted to the user space process depending on the contents of the packets.

Sharing of Packet Pool Among Trusted Ports

By default, Apps are not mutually trusted, so we need to create separate packet pool for each trust domain, e.g. kernel's device packet pool, per-app packet pool. Cross pool data movement incurs data copy thus overhead even for mutually trusted ones.

Packet pools can be configured to be shared across process, e.g. between two processes, between kernel and trusted first-party apps. Thus packet movement doesn't need copying, and this allows for zero-copy data transfers between any of the entities—should the configuration allows for that.

IP Fragments Management. Light Weight Packet Reassemble for Channel (as if Perfect Network Condition)

Flow-switch doesn't own the TCP/IP stack, thus for incoming fragments, which doesn't include full flow info (e.g. first fragment with incomplete TCP header, or later fragments without TCP header), it can't successfully lookup the flow and send to the correct recipient.

The flow-switch does a lightweight fragment reassembly, where it first accumulates all fragments as they come (e.g. using IP address and IP ID, per IP reassembly RFC), then do a single flow lookup, and then delivery all fragments to user space. To the user space protocol stack point of view, the flow-switch provides an in-sequence delivery network abstraction, which makes it easier to handle receiving of fragments in user space protocol stack.

NetNS for Port Tuple Arbitration

Kernel space BSD stack and the user space protocol stack instances need an efficient mechanism to share and arbitrate the 5-tuple network namespace, i.e. who gets to use which port on which source address, etc.

User space network stack infrastructure architecture implements a shared namespace manager (NetNS) to enable sharing and arbitration of the network namespace between the various stack instances.

Offload Control Operations to BSD, e.g. L2 MAC Resolver (ARP/ND) and Callbacks, L3 Route Resolver and Callbacks and ICMP, TCP RST User space network stack infrastructure does not internally employ control protocol handlers such as ARP, ICMP, etc. Without those, user space network stack infrastructure couldn't function as a network host.

User space network stack infrastructure leverage existing functions in BSD stack to handle those types of packets. Flow-switch, when seeing those packets, forward them to BSD stack. User space network stack infrastructure then registers callbacks for events from those BSD stacks, as well as query information for its flow management, etc.

System-Wide Sysctl Via Shared Memory (RO)

In User space network stack infrastructure, IP/TCP stack stays in the user process and is instantiated per process since user process is segregated from another. User space network stack is generally initialized with heuristics from previous connections (e.g. (RTO and TFO). Unlike kernel network stack where it's a single shared instance, we need an efficient way to feed such initialization information to each process.

User space network stack infrastructure implements a system-wide sysctl shared memory region. 1. It is a system-wide memory region shared by all processes to minimize memory usage. 2. It is controllable by user via sysctl command to allow easy tuning. 3. It is readable and controllable by kernel network stack if needed. 4. For information that is only read by user space during initialization, after a change made, it can be reflected to newly instantiated user space network stack. 5. For information that is read during runtime, it can be pickup by both existing and newly instantiated user space network stack.

Leverage Shared Memory for User Space Stack. Per Stack Stats and Also Per Flow Stats.

The user space protocol stack need to publish stats/knowledge for kernel stack or other instances of user space protocol stack efficiently. It's costly to pass those information across user space/kernel boundary.

Along with memory mapped packet/buffer, the nexus also create a shared memory region for stats objects, the kernel would retrieve the stats efficiently using directly memory reference, either periodically or based on event.

User Space Network Stack Statistics Preservation (Fold into Kernel Stats when User Space Stack Goes Away).

The user space protocol stack, unlike BSD kernel stack, is instantiated per process and could come and go with process life cycle, thus user space protocol stack stats could be lost (when app exits).

When a user space protocol stack instance is destroyed, the user space protocol stack would do a final publication of the stats, either via the aforementioned shared stats memory region or system call, then the kernel would preserve the stats into kernel for accounting and diagnostic purpose.

Trusted RTT Estimation Based on Passive Observation.

The user space protocol stack needs a feedback mechanism to tell the kernel about its packet processing state, e.g. the processing time of each packet as compared to kernel protocol stack.

The flow tracker passively and selectively timestamp TCP packets and computes the processing time of RX packets and network latency of TX packets. This information is kept in the flow entry for bounds checking and scheduler hint, as well as diagnostic purpose.

NLC v2 (NetEm)

We need to handle various networking conditions, e.g. burst cellular downlink; \but before that we need a way to simulate it.

There is a NetEm packet scheduler on Rx/TX to simulate those networking conditions, to simulate hardware features, etc. This is done by leveraging User space network stack infrastructure's built-in infrastructures, e.g. pre- and post-sync and notify operations on the rings/queues.

Compressor & Decompressor

Need to handle header compression and decompression, e.g. 6LoWPAN.

Post-AQM (TX) and Pre-Input (RX) processing hooks for handling packet header compression and decompression, by leveraging built-in hooks provided by the data path infrastructure.

Batching Optimizations in Bluetooth Daemon

Reduce the per packet cost for bluetooth communication.

Implement packet batching heuristics in bluetooth user space driver and efficiently move packet batches over user space network stack infrastructure channels, to/from agent processes, as well as to/from kernel UART HW driver.

Replacing Socket-Based IPC with Channel: User Pipe (Bluetoothd & Identityservicesd) Kernel Pipe (Bluetoothd & AppleOnboardSerial)

Need an efficient IPC between user space processes. Need efficient packet I/O interface for user space driver.

User space network stack infrastructure upipe nexus provides an efficient zero-copy packet I/O infrastructure for IPC. It also provides the ability to send and receive batch of packets helping to amortize the cost of system calls.

User space network stack infrastructure kernel pipe nexus provides a fast zero-copy I/O infrastructure for a user space protocol driver to communicate to low level in-kernel hardware driver. It also provides the ability to send and receive batch of packets helping to amortize the cost of system calls.

Mitigation Thread Dynamic Threshold Table.

An interrupt mitigation scheme helping to reduce the interrupt processing load while preserving low latency and throughput.

An adaptive interrupt mitigation logic constantly adjusting based on packet statistics. The adjustment thresholds for the mitigation logic can be programmed for an interface based on it throughput and link characteristics.

Using RXmitigation and RXring Size to Normalize Packet Flow in Bursty Cellular Conditions Cellular radio conditions could lead to bursty receiving (very high throughput), leading to packet drop in the stack.

Normalizing the bursty packet load at the network interface by adjusting the mitigation logic thresholds and input queue size to get a uniform throughput in bursty scenarios. This is critical for performance, as bursty packet delivery might result in significant packet loss within the system itself.

Local RTTw/CLPC Close Loop to Optimize User Stack Latency.

User space network stack infrastructure IP/TCP stack operates in user space where process generally have lower scheduling priority than the kernel. The time to process incoming data and generates acknowledgements to server should be kept small, such that server can send next data sooner to reduce the total time of payload transfer. Since user space network stack doesn't have as high priority as kernel network stack, there needs to be a way to make sure they get enough CPU time.

To do this, we leverage the RTT estimation technique built in flow-switch to track the user stack processing time and form a close loop along with scheduler and CPU frequency adjuster. The closed loop controller gets input from flow-switch local RTT (user space network stack processing time) estimation, CPU frequency and process scheduling properties, the output is next CPU frequency and process priority. The end result is user space network stack gets enough CPU frequency and time without using extra power and still gets close to kernel network stack performance.

Submission/Completion Queue Driver Model

Device drivers require a common and flexible queueing model in the device driver abstraction layer for packet I/O. The queues hide the underlying User space network stack infrastructure rings, and also reduces the locking contention between the driver work loop and the User space network stack infrastructure threads.

Driver facing queues in the IOSkywalkFamily exposes queues based on the submission/completion model and are internally backed by User space network stack infrastructure rings. The submission queues dispatches packets to the device driver, with the goal of keeping the hardware ring/queue full without overflowing it. Packets are delivered to the driver in batches to reduce the per-packet cost. Completion queue handles packets returned by the driver, and also provides feedback to the respective submission queue to implement flow control.

Receive Submission/Completion Queues that Work with Buffers Instead of Packets

A mechanism for device drivers to leverage the "multi-buflet descriptors" idea while still based on the submission/completion queue model.

A receive buffer submission queue will dispatch an array of new packet buffers (not packets) to the driver. The network hardware then fills those buffers with received data, with packets that can potentially span across multiple buffers. The driver will then notify the buffer completion queue, who will allocate an array of zero-buflet packets and present that packet array to the driver. The driver can then attach one or more buffers to each packet, and also update the packet metadata.

Driver Doorbell and Refill

Free-standing transmit packets in a driver level ring or queue defeats the purpose of the AQM queue. Need a mechanism to prevent this by using a transmit doorbell and AQM refill.

A doorbell notifies the driver layer when one or more packet is available, IOSkywalkFamily will then query the driver for the amount of free space available, in in either packets or bytes. A refill operation is then requested with this free space information which will dequeue a bounded amount of packets from the AQM queue and pass them along to the drivers ring/queue for immediate consumption.

Queue Level Reporting for Network Scheduling

LTE requires the modem to send to the base station a "buffer status report" (BSR) indicating the amount of data the modem intends to transmit to the base station. The base station may then send a "grant" to the modem, which entitles the modem to transmit a certain amount of data. This mechanism enables the base station to manage network resources according to policies specified by the network operator. Once such policy may be to prioritize each device according to the amount of data it reported in its latest BSR. Another policy may be to deprioritize a device which reports via BSR more data than it actually transmits in response to a grant.

It is possible to consider only the amount of data pending in modem TX queues when sending BSR. For such an implementation, limiting modem TX queue lengths to reduce bufferbloat also limits the amount of data the modem is able to report in its BSR, which may reduce the sizes of the grants allocated to the modem by the base station. Existing implementations enable the host to communicate its interface queue lengths to the modem for inclusion in BSR reports. However with IOSkywalkFamily there is not necessarily any such interface queue.

We added capability of reporting the size of host AQM queues to the modem. This report includes only data which is guaranteed to be sent to the modem.

Provide Possible Data Transmission Opportunity Enabling Efficient Resource Allocation To save power, radio HW enters a low-power state after a certain interval of inactivity. As a further optimization, existing implementations enter this state more quickly ("fast dormancy") if no data transmission is imminent. To determine whether data transmission is imminent, existing implementations enable the host to communicate its interface queue lengths and socket buffer lengths to the modem. However with IOSkywalkFamily there is not necessarily any such interface queue or socket buffer.

We added capability of reporting a hint for whether additional data might be sent to the modem. This report includes data which is guaranteed to be sent to the modem, and also includes data which may or may not be sent, e.g. data in TCP retransmission queues or data which may be cancelled by the app.

Transparent Security (IPsec) Gateway

The current in-kernel implementation of IPsec requires a system reboot for updates to take effect. This is not desirable for certain use cases. It also suffers from performance issues associated with the BSD networking stack design.

User space network stack infrastructure will allow most IPsec components to be in user space. Installing new components will only require restarting the user space IPsec forwarding daemon. In addition, the user space transformation plane allows for significantly better performance due to the elimination of costs associated with in-kernel design and implementation.

Bridging, Forwarding and Routing

A general purpose networking stack is not ideal for bridging/forwarding/routing because the data path involves traversing many network stack layers.

User space network stack infrastructure's architecture allows for implementing a customized user space data path optimized for forwarding. This design allows the user space data path to better leverage hardware capabilities such as flow classification and encryption offload for improved performance. Note that this refers to a user space forwarding plane, rather than in-kernel.

Tapping on any Channel (libpcap/tcpdump)

We need to know what user space stack is sending and receiving in their channel efficiently.

We created a special type of nexus called monitor nexus, which taps on the same channel that it is monitoring, and hooks up libpcap/tcpdump to allow existing API to be used to get those packets. This allows us to provide a uniform way to inspect traffic going across any channels in the system.

Test User Space TCP Stack

We needed to run network transport testing tools on user space stacks. The existing tools utilizing BSD sockets APIs no longer work.

We used the monitor nexus and the libpcap changes described above along with improved support for libnetcore in packetdrill to test the user space TCP stack. This allows us to validate that the user space TCP stack is on par with the kernel TCP, in terms of functionalities and correctness.

Nexus Statistics (Flow-Switch Stats)/Channel Statistics (Ring Stats/Sync Stats)/Flow Stats In a packet I/O infrastructure when data is moving across multiple layers, it is important to have visibility into statistics at each layer. These statistics can be used for varying needs: Diagnosing issues, Data accounting, memory allocation and purging heuristics.

In the nexus, it counts stats in several tiers, 1. nexus stats which include all packets going through it, including all channels and BSD stack; 2. channel stats which only accounts for packets going through channel. It includes ring stats and sync stats, which provides insight like batch size per sync. 3. flow stats, which provides packets/bytes counter as well as flow states.

Scheduling Hint Added to TCP RTT Each Process Running User Space

TCP protocol on our system uses the round trip time (RTT) learnt from previous connections to the same destination. The RTT information for each TCP connection is stored on the system and is used by each new TCP flow to bootstrap its learning about the network path to the destination. This helps the new TCP flows recover quickly from packet losses seen on the network.

With User space network stack infrastructure, TCP runs in each user process's context. Each process running user space TCP has a different scheduling priority. This scheduling priority adds to the delay in responding to the TCP packets, which has an impact on the observed TCP RTT. So, a lower priority process with higher scheduling delays could see a higher TCP RTT to the same destination compared to a higher priority process.

If the stack use the RTT learnt by the system, a new flow in the higher priority processes could use the hints from a lower priority process. This could have a bad impact on the TCP connection. So, we need to reduce the impact of one process's observed RTT from impacting the RTT of another process during TCP initialization.

We maintain a per process TCP RTT heuristics, which tracks the TCP RTT for flows only within that process. So, a new flow opened in a process leverages the learnt TCP RTT only from the same process. This minimizes the impact of different process scheduling priorities.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for managing user space communication stacks, the method comprising:
    configuring a first user space application with pass-through checksum functionality, wherein the first user space application comprises a user space communication stack in a user space;
    reading data from a first pool of resources associated with the first user space application, wherein the first pool of resources is within a kernel space and the data is generated by the user space communication stack of the first user space application in the user space, and wherein the user space is different from the kernel space; and
    copying the data read from the first pool of resources to a second pool of resources associated with a hardware driver, the copying of the data comprising:
        (i) processing the data read from the first pool of resources by calculating a checksum value based on the data, the calculating of the checksum value occurring as part of the copying the data; and
        (ii) causing storage of the processed data in the second pool of resources.

2. The method of claim 1, wherein reading the data comprises reading a plurality of word segments.

3. The method of claim 2, wherein calculating the checksum value based on the data comprises a running summation of the plurality of word segments.

4. The method of claim 3, wherein causing storage of the processed data in the second pool of resources comprises storing the checksum value.

5. The method of claim 4, wherein reading the data from the first pool of resources is performed by a kernel space process.

6. The method of claim 4, wherein calculating the checksum value is performed by a kernel space process.

7. The method of claim 1, wherein the hardware driver is configured for a network interface card.

8. The method of claim 1, wherein the hardware driver does not provide checksum functionality.

9. A system configured for managing user space communication stacks, the system comprising:
    a user space application that comprises a user space communication stack in a user space of a system memory;
    a first pool of dedicated memory resources in a kernel space of the system memory for the user space application in the user space, wherein the user space is different from the kernel space;
    a second pool of dedicated memory resources for a kernel space hardware driver;
    a kernel space flow-switch configured to copy data from the first pool of dedicated memory resources to the second pool of dedicated memory resources; and
    a processor coupled to the system memory, and configured to:
        read data from the first pool of dedicated memory resources;

modify the read data, the modification comprising (i) calculation of a checksum value based on the data during a copy operation of the data from the first pool of dedicated memory resources, and (ii) insertion of the calculated checksum value in the data; and store the modified data in the second pool of dedicated memory resources.

10. The system of claim 9, wherein the kernel space hardware driver comprises a network interface card.

11. The system of claim 10, wherein the network interface card is configured to transmit IP data.

12. The system of claim 10, wherein the network interface card does not include a checksum functionality.

13. The system of claim 10, wherein the checksum value is inserted into a protocol header of a packet in the data.

14. The system of claim 13, wherein the user space communication stack operates without the checksum functionality.

15. The system of claim 14, wherein the user space communication stack includes a Transmission Control Protocol (TCP)/Internet Protocol (IP) networking stack.

16. The system of claim 9, wherein the processor is configured to read data from the first pool of dedicated memory resources in word segments.

17. The system of claim 16, wherein the processor is configured to calculate the checksum value from the word segments.

18. The system of claim 9, wherein a kernel thread handling a legacy networking stack in the kernel space has a higher priority than the user space application.

19. A non-transitory computer readable apparatus comprising a storage medium having one or more computer programs stored thereon, the one or more computer programs being configured to, when executed by a processing apparatus, cause a computerized apparatus to:

read one word of data from a first pool of memory within a kernel space for a copy process, the copy process comprising copying the one word of data to a second pool of memory, wherein the data is generated by a user space communication stack included in a user space application in a user space, and wherein the user space is different from the kernel space;

during the copy process, calculate a checksum value based on the one word of data;

modify the one word of data based on the checksum value calculated during the copy process; and store the modified one word of data in the second pool of memory.

20. The non-transitory computer readable apparatus of claim 19, wherein the first pool of memory is dedicated to a first application comprising a hardware driver, the hardware driver receiving data for the user space communication stack.

* * * * *